(12) United States Patent
Gustin et al.

(10) Patent No.: US 12,436,616 B2
(45) Date of Patent: Oct. 7, 2025

(54) REPLACING PHYSICALITY

(71) Applicant: eBay Inc., San Jose, CA (US)

(72) Inventors: Clayton Gustin, London (GB); Deepak Rangaswami, Milpitas, CA (US); Stefan Belavy, Portland, OR (US); Antonio Haro, Walnut Creek, CA (US); Andrew Chalkley, Portland, CA (US)

(73) Assignee: eBay Inc., San Jose, CA (US)

( * ) Notice: Subject to any disclaimer, the term of this patent is extended or adjusted under 35 U.S.C. 154(b) by 814 days.

(21) Appl. No.: 17/731,830

(22) Filed: Apr. 28, 2022

(65) Prior Publication Data

US 2022/0253142 A1 Aug. 11, 2022

Related U.S. Application Data

(63) Continuation-in-part of application No. 17/339,272, filed on Jun. 4, 2021, now abandoned, which is a continuation of application No. 16/744,528, filed on Jan. 16, 2020, now Pat. No. 11,029,760, which is a continuation of application No. 16/001,347, filed on Jun. 6, 2018, now Pat. No. 10,579,145, which is a continuation of application No. 15/878,844, filed on
(Continued)

(51) Int. Cl.
*G06T 19/00* (2011.01)
*G06F 3/01* (2006.01)

(52) U.S. Cl.
CPC .............. *G06F 3/016* (2013.01); *G06F 3/011* (2013.01); *G06T 19/006* (2013.01)

(58) Field of Classification Search
CPC ......... G06T 19/006; G06F 3/011; G06F 3/016
USPC ....................................................... 345/633
See application file for complete search history.

(56) References Cited

U.S. PATENT DOCUMENTS 8,294,557 B1   10/2012   El Saddik et al.
8,942,828 B1   1/2015   Schecter
(Continued)

FOREIGN PATENT DOCUMENTS

CN   102508562   6/2012
CN   203355211   12/2013
(Continued)

OTHER PUBLICATIONS 23165502.8 , "Extended European Search Report", EP Application No. 23165502.8, Sep. 15, 2023, 8 pages.
(Continued)

*Primary Examiner* — Thomas J Lett
(74) *Attorney, Agent, or Firm* — FIG. 1 Patents

(57) ABSTRACT

Simulating interaction with an object represented in a virtual environment is disclosed. A system includes one or more circuits configured to receive an indicator of a sensed touch in a virtual environment and to determine, based on the indicator, an area of the sensed touch. The one or more circuits are further configured to generate a simulated touch by applying a field to one or more touch simulators, the field actuating the one or more touch simulators by linearly displacing an element of the one or more touch simulators. In implementations, the touch simulators are actuated based on data describing textures and weights of the object represented in the virtual environment.

20 Claims, 21 Drawing Sheets
(5 of 21 Drawing Sheet(s) Filed in Color)

Related U.S. Application Data

Jan. 24, 2018, now abandoned, which is a continuation of application No. 15/008,211, filed on Jan. 27, 2016, now Pat. No. 9,971,408.

(56) References Cited

U.S. PATENT DOCUMENTS

| | | | |
|---|---|---|---|
| 9,665,174 B2 | 5/2017 | Osman | |
| 9,741,216 B1 | 8/2017 | Keller et al. | |
| 9,971,408 B2 | 5/2018 | Gustin | |
| 10,579,145 B2 | 3/2020 | Gustin | |
| 11,029,760 B2 | 6/2021 | Gustin | |
| 2005/0012485 A1 | 1/2005 | Dundon | |
| 2006/0161218 A1* | 7/2006 | Danilov | A61B 5/682 607/45 |
| 2008/0147515 A1* | 6/2008 | Abraham | G06Q 30/0603 235/383 |
| 2009/0120105 A1 | 5/2009 | Ramsay et al. | |
| 2009/0251421 A1 | 10/2009 | Bloebaum et al. | |
| 2009/0312808 A1* | 12/2009 | Tyler | A61B 5/682 607/2 |
| 2010/0141407 A1 | 6/2010 | Heubel et al. | |
| 2010/0261526 A1 | 10/2010 | Anderson et al. | |
| 2010/0306120 A1 | 12/2010 | Ciptawilangga | |
| 2010/0306825 A1 | 12/2010 | Spivack | |
| 2011/0148607 A1* | 6/2011 | Zeleny | A41D 31/02 340/407.1 |
| 2012/0142416 A1 | 6/2012 | Joutras | |
| 2012/0200528 A1 | 8/2012 | Ciesla et al. | |
| 2013/0155020 A1 | 6/2013 | Meubel et al. | |
| 2013/0162632 A1 | 6/2013 | Varga et al. | |
| 2013/0198625 A1* | 8/2013 | Anderson | G06F 3/016 715/701 |
| 2014/0184384 A1 | 7/2014 | Zhu et al. | |
| 2014/0214206 A1* | 7/2014 | Steinberg | B25J 13/025 700/258 |
| 2014/0249961 A1* | 9/2014 | Zagel | G06T 11/60 705/26.61 |
| 2015/0145656 A1 | 5/2015 | Levesque et al. | |
| 2015/0290454 A1* | 10/2015 | Tyler | G06F 3/012 607/134 |
| 2015/0331483 A1* | 11/2015 | Cieszkowski, III | G06F 3/011 345/156 |
| 2016/0000374 A1 | 1/2016 | Dandekar et al. | |
| 2016/0034543 A1 | 2/2016 | Nagar et al. | |
| 2016/0058657 A1 | 3/2016 | Lal et al. | |
| 2016/0139666 A1 | 5/2016 | Rubin et al. | |
| 2016/0179199 A1 | 6/2016 | Levesque et al. | |
| 2016/0220808 A1 | 8/2016 | Hyde et al. | |
| 2016/0225188 A1* | 8/2016 | Ruddell | G06T 19/006 |
| 2016/0274662 A1 | 9/2016 | Rimon et al. | |
| 2016/0331631 A1 | 11/2016 | Odi | |
| 2016/0374886 A1 | 12/2016 | Wyatt et al. | |
| 2017/0079875 A1 | 3/2017 | Qiao | |
| 2017/0212593 A1 | 7/2017 | Gustin | |
| 2017/0272838 A1 | 9/2017 | Glazer et al. | |
| 2018/0284898 A1 | 10/2018 | Gustin | |
| 2020/0218355 A1 | 7/2020 | Gustin | |
| 2021/0294420 A1 | 9/2021 | Gustin | |
| 2022/0016673 A1 | 1/2022 | Lee et al. | |
| 2022/0221716 A1 | 7/2022 | Welch et al. | |

FOREIGN PATENT DOCUMENTS

| | | |
|---|---|---|
| CN | 107391020 | 11/2017 |
| EP | 2624238 | 8/2013 |
| EP | 2406702 B1 | 3/2019 |
| WO | 2017132025 | 8/2017 |

OTHER PUBLICATIONS

U.S. Appl. No. 17/339,272, "Non-Final Office Action", U.S. Appl. No. 17/339,272, Oct. 4, 2022, 11 pages.

U.S. Appl. No. 15/008,211, "Corrected Notice of Allowability received for U.S. Appl. No. 15/008,211, mailed on Apr. 16, 2018", Apr. 16, 2018, 5 Pages.

U.S. Appl. No. 15/008,211, "First Action Interview—Pre-Interview Communication received for U.S. Appl. No. 15/008,211, mailed on Nov. 2, 2016", Nov. 2, 2016, 5 Pages.

U.S. Appl. No. 15/008,211, "First Action Interview—Office Action Summary received for U.S. Appl. No. 15/008,211, mailed on Mar. 30, 2017", Mar. 30, 2017, 6 Pages.

U.S. Appl. No. 15/008,211, "Notice of Allowance Received for U.S. Appl. No. 15/008,211, mailed on Oct. 17, 2017", Oct. 17, 2017, 9 Pages.

U.S. Appl. No. 15/008,211, "Response to First Action Interview—Office Action Summary filed on Jun. 30, 2017 for U.S. Appl. No. 15/008,211 mailed on Mar. 30, 2017", Jun. 30, 2017, 10 Pages.

U.S. Appl. No. 16/001,347, "Corrected Notice of Allowability Received for U.S. Appl. No. 16/001,347, mailed on Jan. 21, 2020", Jan. 21, 2020, 7 Pages.

U.S. Appl. No. 16/001,347, "Non-Final Office Action received for U.S. Appl. No. 16/001,347, mailed on Jun. 27, 2019", Jun. 27, 2017, 12 Pages.

U.S. Appl. No. 16/001,347, "Notice of Allowance Received for U.S. Appl. No. 16/001,347, mailed on Oct. 10, 2019", Oct. 10, 2019, 8 Pages.

U.S. Appl. No. 16/001,347, "Response to Non-Final Office Action Filed on Sep. 25, 2019, for U.S. Appl. No. 16/001,347, mailed on Jun. 27, 2019", Sep. 25, 2019, 9 Pages.

U.S. Appl. No. 16/744,528, "Applicant Initiated Interview Summary Received for U.S. Appl. No. 16/744,528, mailed on Oct. 22, 2020", Oct. 22, 2020, 3 Pages.

U.S. Appl. No. 16/744,528, "Final Office Action Received for U.S. Appl. No. 16/744,528, mailed on Oct. 29, 2020", Oct. 29, 2020, 10 Pages.

U.S. Appl. No. 16/744,528, "Non Final Office Action Received for U.S. Appl. No. 16/744,528, mailed on Jun. 18, 2020", Jun. 18, 2020, 9 Pages.

U.S. Appl. No. 16/744,528, "Notice of Allowance Received for U.S. Appl. No. 16/744,528, mailed on Feb. 9, 2021", Feb. 9, 2021, 9 Pages.

U.S. Appl. No. 16/744,528, "Preliminary Amendment Filed on Mar. 31, 2020 for U.S. Appl. No. 16/744,528", Mar. 31, 2020, 6 Pages.

U.S. Appl. No. 16/744,528, "Response to Final Office Action Filed on Dec. 7, 2020, for U.S. Appl. No. 16/744,528, mailed on Oct. 29, 2020", Dec. 7, 2020, 9 Pages.

U.S. Appl. No. 16/744,528, "Response to Non-Final Office Action filed on Jul. 21, 2020 for U.S. Appl. No. 16/744,528, mailed on Jun. 18, 2020", Jul. 21, 2020, 10 Pages.

Bowman, et al., "Using Pinch Gloves(TM) for both Natural and Abstract Interaction Techniques in Virtual Environments", Retrieved from Internet URL: <http://people.cs.vt.edu/~bowman/papers/pinch_gloves, Jan. 2001, 5 Pages.

PCT/US2017/013925, "International Preliminary Report on Patentability and Written Opinion received for PCT Patent Application No. PCT/US2017/013925, mailed on Aug. 9, 2018", Aug. 9, 2018, 8 Pages.

PCT/US2017/013925, "International Search Report received for PCT Patent Application No. PCT/US2017/013925, mailed on Mar. 27, 2017", Mar. 27, 2017, 2 Pages.

PCT/US2017/013925, "International Written Opinion received for PCT Patent Application No. PCT/US2017/013925 mailed on Mar. 27, 2017", Mar. 27, 2017, 6 Pages.

U.S. Appl. No. 17/339,272, "Final Office Action", U.S. Appl. No. 17/339,272, Mar. 3, 2023, 14 pages.

* cited by examiner

1000

REPLACING PHYSICALITY

RELATED APPLICATIONS

This application is a continuation-in-part of U.S. application Ser. No. 17/339,272, filed Jun. 4, 2021, which is a continuation of U.S. application Ser. No. 16/744,528, filed Jan. 16, 2020, which is a continuation of U.S. application Ser. No. 16/001,347, filed Jun. 6, 2018, which is a continuation of U.S. patent application Ser. No. 15/878,844, filed Jan. 24, 2018, which is a continuation of Ser. No. 15/008,211, filed Jan. 27, 2016, now U.S. Pat. No. 9,971,408, the disclosures of which are hereby incorporated by reference in their entireties.

TECHNICAL FIELD

Embodiments of the present disclosure relate generally to virtual environments and, more particularly, but not by way of limitation, to simulating a touch from a virtual environment using a physical interface.

BACKGROUND

Conventionally, as a user interacts with a virtual environment, the user does not physically touch items in the virtual world. Instead, systems typically attempt to simulate touch using various methods.

In one example, a system attaches control arms to fingers in a glove. As the control arms cause the fingers to move, the user wearing the glove may sense a sort of touch, or resistance.

In another example, a system employs a set of inflatable air bags or pockets which, when inflated, may cause a touch sensation by the user, however, the resolution of such a system is limited in granularity and cannot simulate the texture of a touched thing in the virtual world.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various ones of the appended drawings merely illustrate example implementations of the present disclosure and cannot be considered as limiting its scope.

Figure 1:
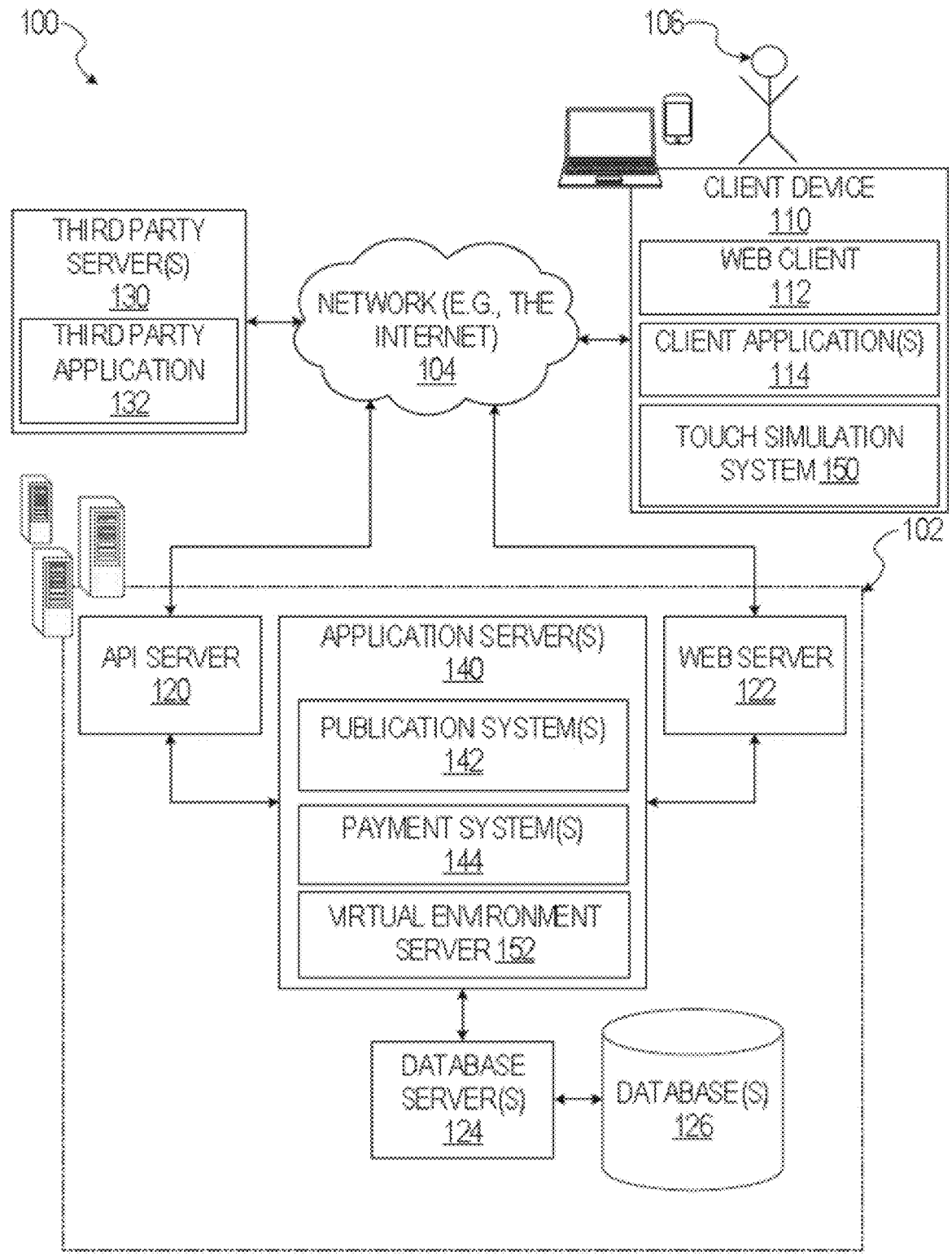
FIG. 1 is a block diagram illustrating a system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In certain embodiments, a system as described herein, includes an array of micro-touch simulators embedded in an article of clothing. In one example, the micro-touch simulators operate as part of a glove. In certain example, a system applies respective electric fields to selected micro-touch simulators causing the micro-touch simulators to press against the skin of the user wearing the glove. In this way, the system can simulate a touch in a virtual environment. While described with respect to being implemented in an article of clothing, the array of micro-touch simulators is configured for implementation in any range of devices, such as disposed under a trackpad, a touchscreen, a wearable device, combinations thereof, and so forth.

In other example embodiments, micro-touch simulators are electrically charged micro-spheres that are actuated by the electric field applied. In one example, a different electrical field is applied to each of a set of micro-spheres in the article of clothing causing a different amount of pressure for respective micro-spheres. In one example embodiment, the micro-touch simulators are magnetic cylinders that are actuated by a magnetic field causing the micro-touch simulators to press against the skin of the user wearing the glove.

In this way, a touch simulation system can apply a wide range of different amounts of force in different areas. Accordingly, the touch simulation system is capable of simulating the texture of a touch as well as the simple location of the touch.

In one example, the micro-touch simulators approximately 10 microns in size allowing the touch simulation system to simulate any texture with a resolution of 10 microns or greater. In a specific example, the micro-touch simulators are stimulated in such a way so as to resemble snakeskin because the texture of snakeskin can be simulated using a resolution of 10 microns or greater.

In other examples, the micro-touch simulators are affected to simulate the texture of the individual scales as well as space between scales, ridges, protrusions, and other physical features of snakeskin. In this way, a user may touch a snake in a virtual environment and the touch simulation system simulates the touch and feel of the snake using the glove. In this way, the physical experience of the user more closely resembles the virtual environment than with currently available techniques or methods.

In other examples, the touch simulation system simulates a dynamic touch that moves across the user's skin. By activating iterative sets of micro-touch simulators, the touch simulation system can simulate a touch moving across the user's skin as will be further described. In another example, the touch simulation system simulates rubbing, scratching, pinching, and other more complex tactile sensations.

With reference to FIG. 1, an example embodiment of a high-level client-server-based network architecture 100 is shown. A network system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), client application(s) 114, and a touch simulation system 150 as will be further described, executing on the client device 110.

In one example embodiment, a portion of the touch simulation system 150 is implemented as executable code operating at the client device 110. For example, the portion of the touch simulation system 150 may be connected to an array of micro-touch simulators configured to operate as part of an article of apparel and simulate various touches described herein by activating a set of micro-touch simulators in the apparel.

The client device 110 may comprise, but is not limited to, a mobile phone, desktop computer, laptop, personal digital assistant (PDA), smart phone, tablet, ultra book, netbook, laptop, multi-processor system, microprocessor-based or programmable consumer electronics, game console, set-top box, or any other communication device that a user may utilize to access the network system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital items within the network system 102. In one embodiment, the network system 102 is a network-based marketplace that responds to requests for product listings, publishes publications comprising item listings of products available on the network-based marketplace, and manages payments for these marketplace transactions.

One or more users may be a person 106, a machine, or other means of interacting with the client device 110. In embodiments, the user is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the network system 102, on an as needed basis, for data and/or processing capabilities not locally available (e.g., access to a database of items available for sale, to authenticate a user, to verify a method of payment, etc.). Conversely, if the e-commerce site application is not included in the client device 110, the client device 110 may use its web browser to access the e-commerce site (or a variant thereof) hosted on the network system 102.

In example embodiments, the user is not part of the network architecture 100, but may interact with the network architecture 100 via the client device 110 or other means. For instance, the user provides input (e.g., touch screen input or alphanumeric input) to the client device 110 and the input is then communicated to the network system 102 via the network 104. In this instance, the network system 102, in response to receiving the input from the user, communicates information to the client device 110 via the network 104 to be presented to the user. In this way, the user can interact with the network system 102 using the client device 110.

An application program interface (API) server 120 and a web server 122 are coupled to, and provide programmatic and web interfaces respectively to, one or more application server(s) 140. The application server(s) 140 may host one or more publication systems 142 and payment systems 144, each of which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s)

126. In an example embodiment, the database(s) 126 are storage devices that store information to be posted (e.g., publications or listings) to the publication system(s) 142. The database(s) 126 may also store digital item information in accordance with example embodiments.

In one example embodiment, the virtual environment server 152 manages a virtual environment. As one skilled in the art may appreciate, a virtual environment, in one example, digitally simulates a physical space. The virtual environment, in this example, is displayed to the person 106 using a pair of virtual environment goggles 230. The goggles 230 display the virtual environment to the person 106 and responds to the person's 106 movements. In this way, the person 106 may interact with objects represented in the virtual environment. Of course, the virtual environment may represent any physical scenario and this disclosure is not limited in this regard.

In certain example embodiments, the virtual environment simulates any of the following: a battle scenario, a physical training exercise, a swordfight, a gunfight, a military exercise, a gaming scenario, fighting a dragon, a shopping scenario, viewing and/or touching an item, or the like.

A third-party application 132, executing on third party server(s) 130, is shown as having programmatic access to the network system 102 via the programmatic interface provided by the API server 120. For example, the third-party application 132, utilizing information retrieved from the network system 102, supports one or more features or functions on a website hosted by the third party. The third-party website, for example, provides one or more promotional, marketplace, or payment functions that are supported by the relevant applications of the network system 102.

In one example embodiment, an application server is a virtual environment server 152. In this example, the virtual environment server 152 manages a virtual environment. In certain example, the virtual environment server 152 generates the virtual environment based, at least in part, on input from any other application server 140. In one example, the publication system 142 transmits physical properties of an item including size, color, dimensions, shape, texture, and the like. In response, the virtual environment server 152, according to one example embodiment, generates a virtual environment that includes the item. In another example embodiment, the virtual environment server 152 generates a virtual environment that includes the item. In one example, the virtual environment is a table with the item resting thereon. In this example embodiment, a user interacting with the virtual environment may approach the table and virtually touch and/or feel the item although the user may be at a remote location.

The publication system(s) 142 may provide a number of publication functions and services to users that access the network system 102. The payment system(s) 144 may likewise provide a number of functions to perform or facilitate payments and transactions. While the publication system(s) 142 and payment system(s) 144 are shown in FIG. 1 to both form part of the network system 102, it will be appreciated that, in alternative embodiments, each system 142 and 144 may form part of a payment service that is separate and distinct from the network system 102. In some embodiments, the payment system(s) 144 may form part of the publication system(s) 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and touch simulation system 150 could also be implemented as standalone software programs, which do not necessarily have networking capabilities.

The web client 112 may access the various publication and payment systems 142 and 144 via the web interface supported by the web server 122. Similarly, the touch simulation system 150 may communicate with the network system 102 via a programmatic client. The programmatic client accesses the various services and functions provided by the publication and payment systems 142 and 144 via the programmatic interface provided by the API server 120. The programmatic client may, for example, be a seller application (e.g., the Turbo Lister application developed by eBay® Inc., of San Jose, California) to enable sellers to author and manage listings on the network system 102 in an off-line manner, and to perform batch-mode communications between the programmatic client and the network system 102.

Additionally, a third-party application(s) 132, executing on a third-party server(s) 130, is shown as having programmatic access to the network system 102 via the programmatic interface provided by the API server 120. For example, the third-party application 132, utilizing information retrieved from the network system 102, may support one or more features or functions on a website hosted by the third party. The third-party website may, for example, provide one or more promotional, marketplace, or payment functions that are supported by the relevant applications of the network system 102.

Figure 2:
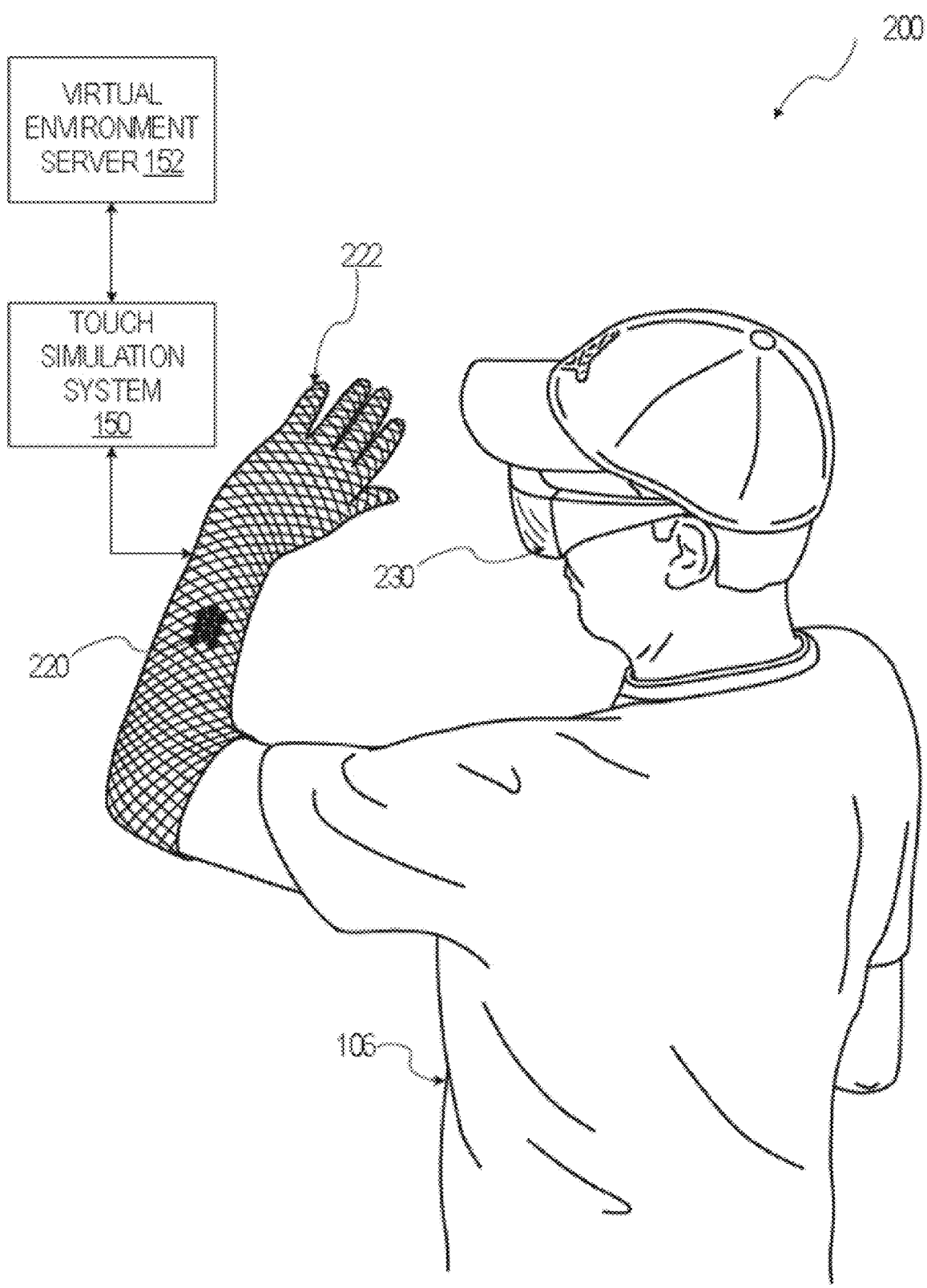
FIG. 2 is an illustration depicting a touch simulation system, according to one example embodiment.

FIG. 2 is an illustration depicting a touch simulation system, according to one example embodiment. In this example embodiment, the system 200 includes the virtual environment server 152, the touch simulation system 150, and a glove 222 that includes an array of micro-touch simulators.

In one example embodiment, the virtual environment, generated by the virtual environment server 152 including an object that touches the person 106 on the forearm indicated by the touch location 220. In one example, in the virtual environment, the person 106 is blocking a sword with the sword contacting the person 106 at the location on the person's forearm.

In this example, the virtual environment server 152 transmits an indication of the touch to the touch simulation system 150. The indication defines the touch in the virtual environment. Furthermore, in other example embodiments, the indication indicates a physical touch location 220.

In one example, the touch simulation system is calibrated to generate a map between certain micro-touch simulators and certain locations on the article of apparel. In this example, calibrating the glove yields a map such that the touch simulation system 150 can determine which micro-touch simulators to activate in response to a touch from the virtual environment server 152.

In one example embodiment, the touch indication further includes a texture of the thing being touched. As will be further described, the touch simulation system 150, in certain embodiments, also simulates the indicated texture. By activating certain micro-touch simulators according to the texture, the touch simulation system 150 generates the touching sensation consistent with the indicated texture. In this way, the touch simulation system 150 simulates the touch as well as the texture of the touch. In one example, the touch in the virtual environment includes the person 106 touching dragon skin and the touch simulations system 150 activates the micro-touch simulators to simulate dragon skin.

In one example embodiment, the touch simulation system 150 includes a database of textures. In response to receiving a touch that includes a touch texture, the touch simulations system 150 loads the indicated touch texture from the database and generates a command to simulate the texture of the touch at the physical touch location 220.

In one example embodiment, the touch simulation system 150 applies respective electrical fields to a set of micro-touch simulators causing the micro-touch simulators to contact the skin of the person 106 wearing the article of apparel that includes the array of micro-touch simulators. In this example, the micro-touch simulators are electrically charged microspheres. In another example, the touch simulation system applies respective magnetic fields to a set of micro-touch simulators that are magnetic cylinders to simulate a texture. Example textures are indicated in FIGS. 5A-5D.

In another example embodiment, the touch simulation system also applies a temperature at the physical touch location 220. In one example embodiment, the touch simulation system 150 sends current through an electrical circuit to heat the area of the physical touch location 220. In another example, the touch simulation system 150 powers a Peltier cooler to cool the area of the physical touch location 220. For instance, in an example scenario where the object is a coffee mug filled with coffee, the touch simulation system 150 applies heat to the physical touch location 220 in response to detecting contact with a cup portion of the coffee mug. In response to detecting movement of the physical touch location 220 from the cup portion to a handle portion of the coffee mug, the touch simulation system 150 cools the area of the physical touch location 220, thereby simulating different temperature properties of an object. In implementations, the temperature applied at the physical touch location 220 is dependent on a texture signature for a location of the object contacted by the physical touch location 220. For instance, the texture signature for a metallic portion of an article of clothing (e.g., zipper) causes the touch simulation system 150 to output a cooler temperature relative to a wool portion of the article of clothing Thus, the touch simulation system 150 is configured to represent different objects as well as different portions of a single object using different temperatures and thus mimic physical interaction with the object represented in the virtual environment. Of course, the touch simulation system 150 may affect temperature in any other way as one skilled in the art may appreciate.

Figure 3:
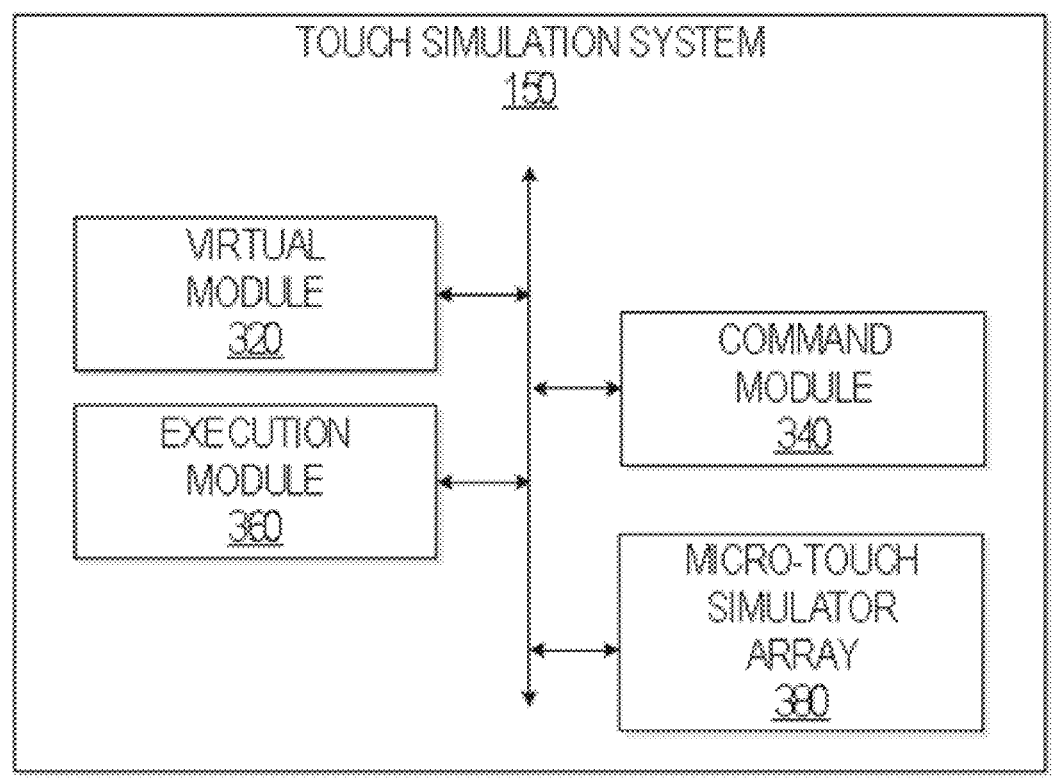
FIG. 3 is a block diagram illustrating one example embodiment of a touch simulation system.

FIG. 3 is a block diagram 300 illustrating one example embodiment of a touch simulation system. In one example embodiment, the touch simulation system 150 includes a micro-touch simulator array 380, a virtual module 320, a command module 340, and an execution module 360.

In one example embodiment, the micro-touch simulator array 380 is configured in an article of apparel. In one example, the apparel is included in a hat, glove, shirt, pants, dress, belt, suit, full-body suit, mask, or any other article configured to be within a proximity to the skin of the person 106 so as to be able to contact the skin of the person 106 as commanded to do so by the touch simulation system 150.

In one example embodiment, the micro-touch simulators each include a charged microsphere that is movable to contact the skin of the person 106 that is wearing the article of apparel. In one example embodiment, the micro-touch simulators each include a magnetic cylinder that is similarly movable. In another example embodiment, the charged microspheres are insulated from each other using an insulator as one skilled in the art may appreciate. In this way, an electrical field is applied to one of the micro-spheres does not move another microsphere that neighbors the microsphere being moved. In this way, each of the microspheres in the array may be moved independently. Similarly, the magnetic cylinders may be moved independently by respective application of magnetic fields at the micro-touch simulators as described herein.

In one example embodiment, the virtual module 320 is configured to receive an indicator of a virtual touch in a virtual environment, the indicator indicating a physical touch location on the article of apparel and a texture of the physical touch.

In one example, the person 106 is represented in a virtual environment. In response to a virtual thing touching the representation of the person 106 in the virtual environment, the virtual environment server 152 determines a location of a touch on the represented person 106. In response, the virtual environment server 152 transmits a message to the virtual module 320 that indicates a corresponding physical location of a physical touch to be simulated on the person 106.

In one example, the virtual environment server 152 and the article of apparel are calibrated so as to generate a mapping of virtual locations on a represented person 106 in the virtual environment and corresponding locations on the article of apparel. In this way, the virtual module 320 can determine a physical location to simulate a touch based, at least in part, on a virtual location of a touch in the virtual environment. In one example, each of the micro-touch simulators are numbered and the mapping associates virtual locations with specific numbered micro-touch simulators.

In another example embodiment, the indicator includes a force of the touch. In response, the virtual module 320 adjusts the signal to the micro-touch simulators to simulate the force of the touch. In one example, the micro-touch simulators are electrically charged micro-spheres and the virtual module 320 increases the electrical field to move the charged micro-sphere in response to an increased force of the touch. In another example, the micro-touch simulators are magnetic cylinders and the virtual module 320 increases the magnetic field to move the cylinders causing increased force against the person's 106 skin. In another example, the virtual module 320 decreases the electrical field to move the charged micro-sphere in response to a decreased force of the touch.

In one example, the person 106 and an item that is available for purchase are represented in a virtual environment. Based on physical movements by the person 106 in the physical world, a representation of the person 106 in the virtual environment may touch an item that is available for sale. In response to the touch, the virtual environment server may transmit an indicator to the virtual module 320 that identifies the location of the touch in the virtual environment and corresponding micro-touch simulators in the article of apparel being worn by the person 106 in the physical world.

In another example embodiment, the indicator identifies an area of the touch and a texture of the touch to be simulated in the area. Similarly, as with the location of the touch the virtual module 320 may identify which micro-touch simulators to activate in the article of apparel according to the texture of the touch as described herein.

In one example embodiment, the command module 340 is configured to generate a command that simulates the texture of the physical touch at the physical touch location by applying respective electric fields to a plurality of micro-touch simulators causing a plurality of the micro-touch simulators to touch the user according to the texture.

As will be further described regarding FIGS. 5A-5D, the touch indicator may indicate a wide variety of different textures. As one skilled in the art may appreciate, a texture includes a pattern of high and low areas at a surface. In one example embodiment, the command module 340 generates one or more commands to move one or more micro-touch simulators to represent the texture indicated by the indicator received from the virtual environment server 152. In certain embodiments, the texture includes varying levels of being bumpy, smooth, coarse, fine, slippery, rough, or other, or the like. In one example embodiment, each level of each texture is stored in a database of textures.

In one example embodiment, the touch indicator indicates a part of the apparel being worn by the person 106 and the touch indicator also indicates two nearby locations of the apparel. In this example, the touch indicator includes two distinct touches to simulate a pinching experience at the physical touch location. In response to receiving In another example, the touch indicator indicates two locations at opposing sides of the apparel. In this example, the touch indicator includes two distinct touches to simulate a grabbing experience at the physical touch location. In response, the command module 340 generates a command that stimulates portions of the micro-touch simulator array according to the distinct touches.

In one example embodiment, the touch indicator indicates a beginning touch location, and end touch location, and a location move speed. In response, the command module 340 stimulates a sequence of portions of the micro-touch simulators to simulate the touch moving from the beginning touch location to the end touch location. In this way, the command module 340 generates a command that simulates a scratching experience by the person 106.

In another example embodiment, the execution module is configured to execute the command(s) generated by the command module to cause the specified micro-touch simulators to touch the user according to the texture as described herein.

In one example embodiment, the virtual environment server 152 may detect that representation of the person 106 in the virtual environment has moved such that the touch no longer represents what is occurring in the virtual environment. In response, the virtual environment server 152 transmits another indicator to the execution module 360 to indicate that the touch is no longer occurring in the virtual environment. In response, and in order to accurately reflect the state of objects in the virtual environment, the execution module suspends simulating the touch. In one example, the execution module causes each of the micro-touch simulators to move away from touching the person 106. In one example where the micro-touch simulators are electrically charged microspheres, the execution module 360 stops the flow of current to the array of microspheres such that they relocate to a natural position (in the absence of an electrical field). In another example, the micro-touch simulators are magnetic cylinders, and the execution module 360 stops the flow of current to the array of magnetic cylinders such that the cylinders relocate to a natural position.

In one example, the magnetic cylinders are mechanically held in the natural position using a spring. In another the magnetic cylinders are held in the natural position using a stretchable material. In this example, application of magnetic field presses the cylinder against the stretchable material to press against the person's 106 skin.

Figure 4:
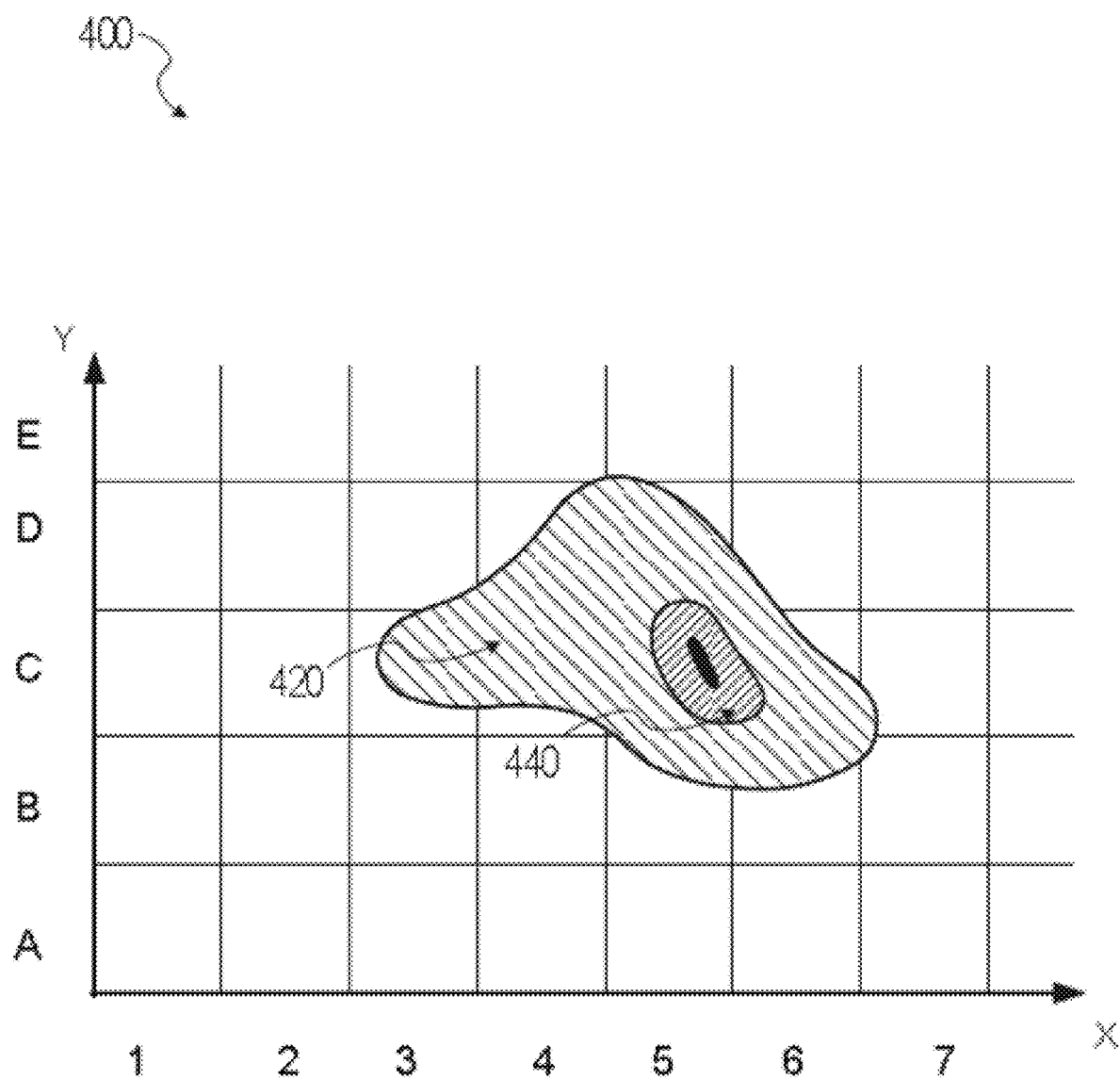
FIG. 4 is a plot depicting various force levels for a touch according to one example embodiment.

FIG. 4 is a plot 400 depicting various force levels for a touch according to one example embodiment. In this example embodiment, the touch indicator indicates different areas for different force levels.

In one example, the virtual module 320 receives the touch indicator and the command module 340 generates a command causing micro-touch simulators at locations C-3, D-4, C-4, D-5, and C-6 at a first force level 420, and micro-touch simulators at location C-5 at a second (and higher) force level 440. According to the plot of force levels, the command module 340 may generate one or more commands causing the micro-touch simulators to move into contact with the person's 106 skin as indicated in the plot 400.

In one example, the command module 340 generates a command that specifies an increased force by applying an increased electrical field to physically move an electrically charged micro-sphere operating as part of a micro-touch simulator. In another example, the command module 340 generates a command that specified an increased magnetic field to physically move a magnetic cylinder operating as part of a micro-touch simulator.

Figure 5A:
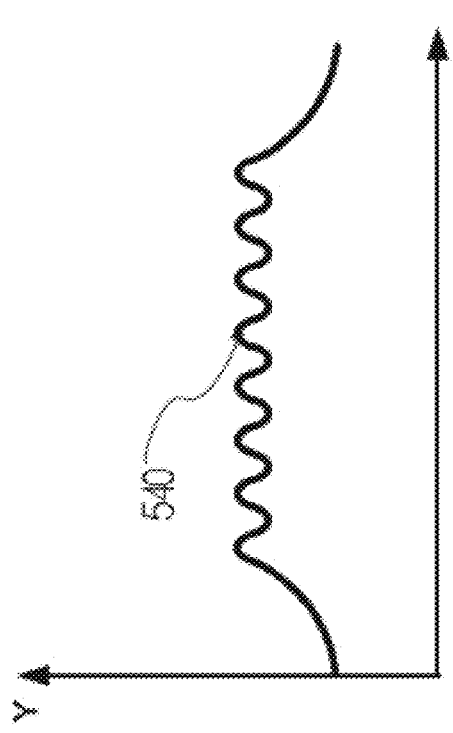
FIG. 5A is a chart depicting a touch texture according to one example embodiment.

FIG. 5A is a chart 520 depicting a touch texture according to one example embodiment. In this example embodiment, the touch indicator indicates a texture comprising equally spaced bumps and a specific height between the tops 522 of the bumps and the bottoms 524 of the bumps. A distance between the bumps feels like a certain texture to a person 106. In one specific example, the height difference is 100 microns.

In another example embodiment, the texture is a three-dimensional surface and the command module 340 generates a command to move one or more micro-touch simulators into contact with the person's 106 skin based on the surface plot.

Figure 5B:
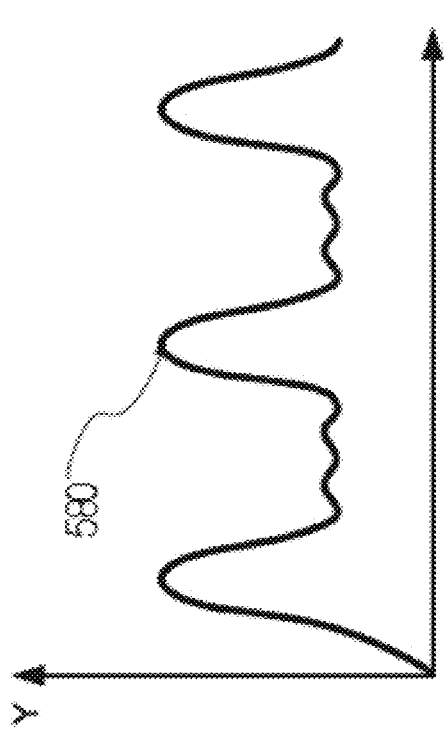
FIG. 5B is a chart depicting another touch texture according to one example embodiment.

FIG. 5B is a chart depicting another touch texture according to one example embodiment. In this example embodiment, the touch indicator indicates a texture comprising equally spaced bumps 540 and a specific height between the tops of the bumps and the bottoms of the bumps. A distance between the bumps feels like a certain texture to a person 106. As compared with FIG. 5A, the height differential between the tops and bottoms is less. In one example, the height difference is 50 microns.

Figure 5C:
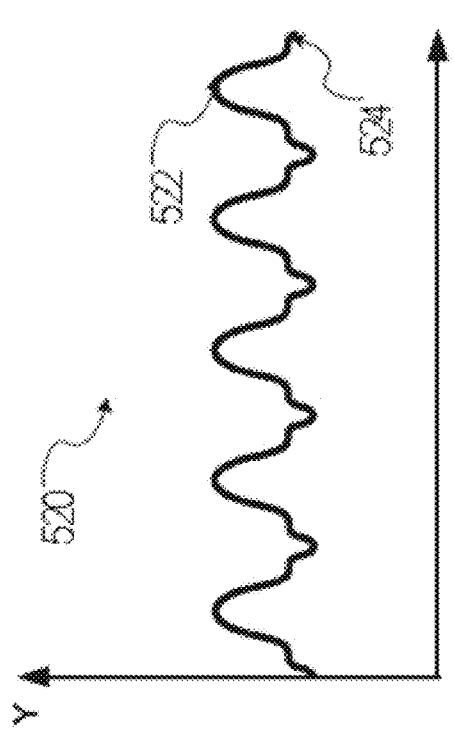
FIG. 5C is a chart depicting a touch texture according to another example embodiment.

FIG. 5C is a chart depicting a touch texture according to another example embodiment. In this example embodiment, the touch indicator indicates a texture comprising a level surface 560. In this example, neighboring micro-touch simulators are moved by the execution module 360 to similar heights. This texture will feel quite smooth to the person 106 because there are no bumps to catch a surface that comes into contact with the texture.

Figure 5D:
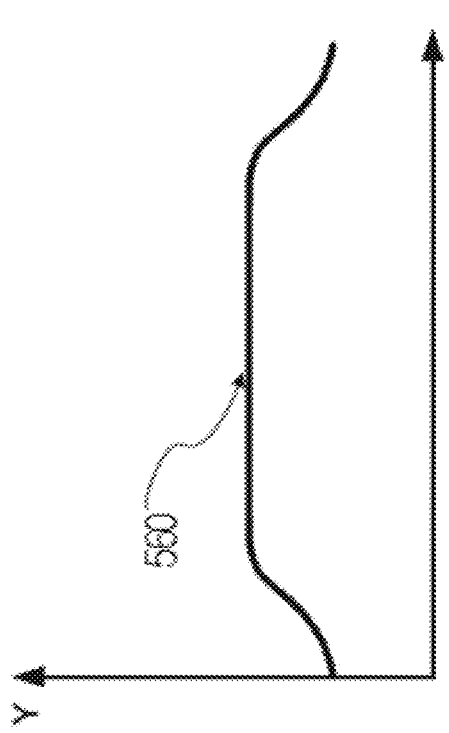
FIG. 5D is a chart depicting a touch texture according to one example embodiment.

FIG. 5D is a chart depicting a touch texture according to one example embodiment. In this example embodiment, the touch indicator indicates a texture comprising equally spaced bumps and a specific height between the tops 580 of the bumps and the bottoms of the bumps. As compared with FIG. 5A, the height differential between the tops and bottoms is more. In one example, the height difference is 500 microns. This texture may feel rough to the person 106.

Figure 6:
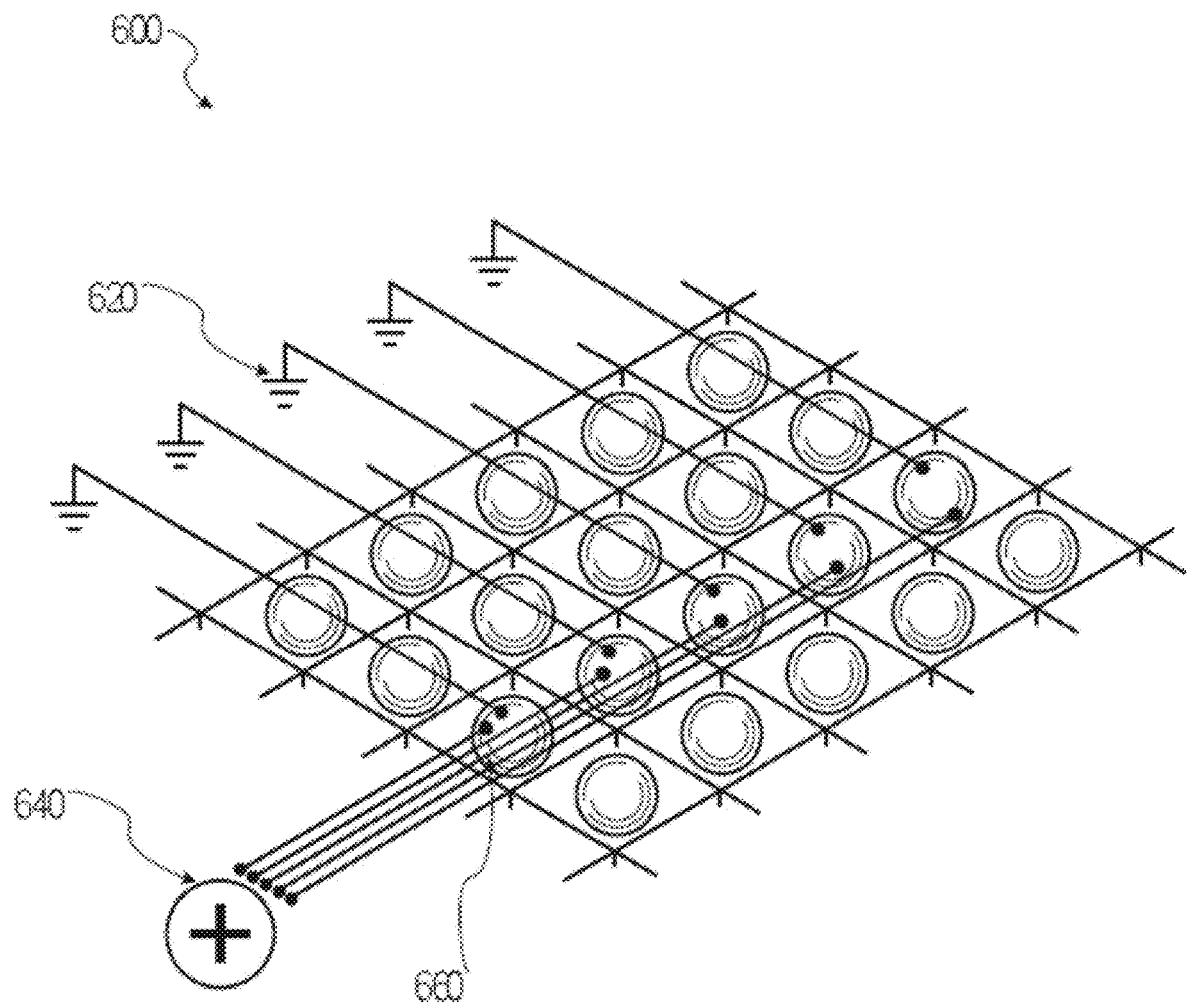
FIG. 6 is an illustration depicting an array of touch simulators according to one example embodiment.

FIG. 6 is an illustration depicting an array 600 of touch simulators according to one example embodiment. In this example embodiment, the micro-touch simulators are electrically charged micro-spheres 660. In one example, the electrically charged microspheres are between 10 and 30 microns in size. According to one example, such a size of between 10 and 30 microns will feel smooth to a person 106 in response to adjacent micro-spheres being moved together.

According to one example embodiment, the electrically charged micro-spheres are set in an array and placed near electrical connectors. In one example, electrical connects connect from a power source 640 and a ground 620. In one example, an electrical potential may be applied from the power source in a coil of wire creating an electrical field which moves the electrically charged micro-sphere as one skilled in the art may appreciate. In another example, a command causes current to flow through a coil of wire creating a magnetic field which moves a magnetic cylinder as one skilled in the art may appreciate.

In one example embodiment, the micro-spheres are electrically charged during a manufacturing process or a calibration process. In one example, the micro-spheres are negatively charged, and the electrical connections generate an electrical field via a coil which repels the negatively charged micro-sphere. In another example embodiment, a separate power source may be configured for each micro-sphere. In this way, each electrically charged micro-sphere may be moved independently. In one example embodiment, the array of micro-spheres further includes means for altering a temperature at each micro-sphere as described herein.

Figure 7:
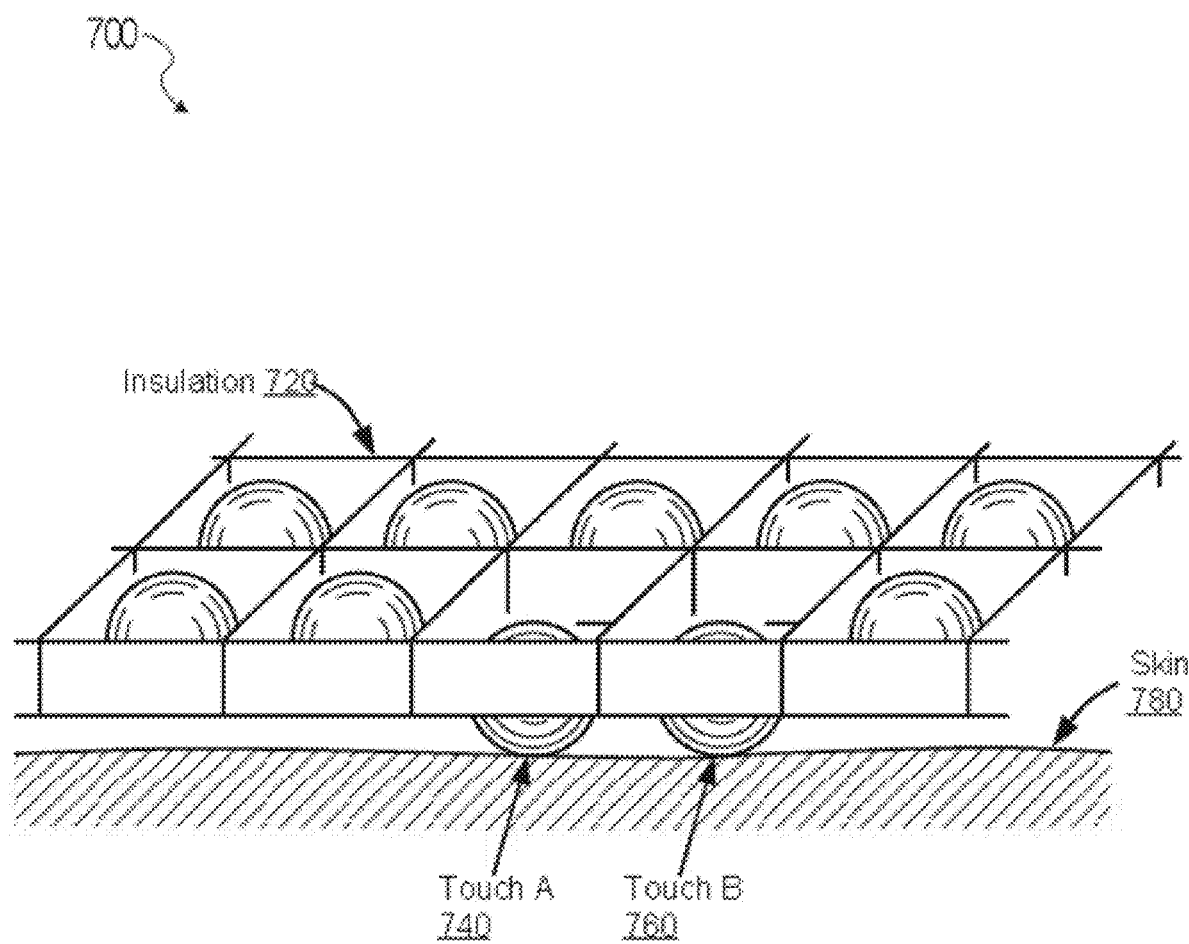
FIG. 7 is another illustration depicting an array of touch simulators according to one example embodiment.

FIG. 7 is another illustration depicting an array 700 of touch simulators according to one example embodiment. In one example embodiment, the micro-touch simulators may be electrically isolated (e.g., using insulation 720) such that an electrical field applied to one of the micro-touch simulators does not affect another of the micro-touch simulators.

In this way, the execution module 360 can move a micro-touch simulator for touch A and a separate micro-touch simulator for touch B to touch the person's 106 skin without moving other micro-touch simulators in the array 700.

In another example embodiment, an insulator is placed between each of the micro-touch simulators and the skin 780 of the person 106 so that an electrical charge associated with the micro-touch simulator is not dissipated.

Figure 8:
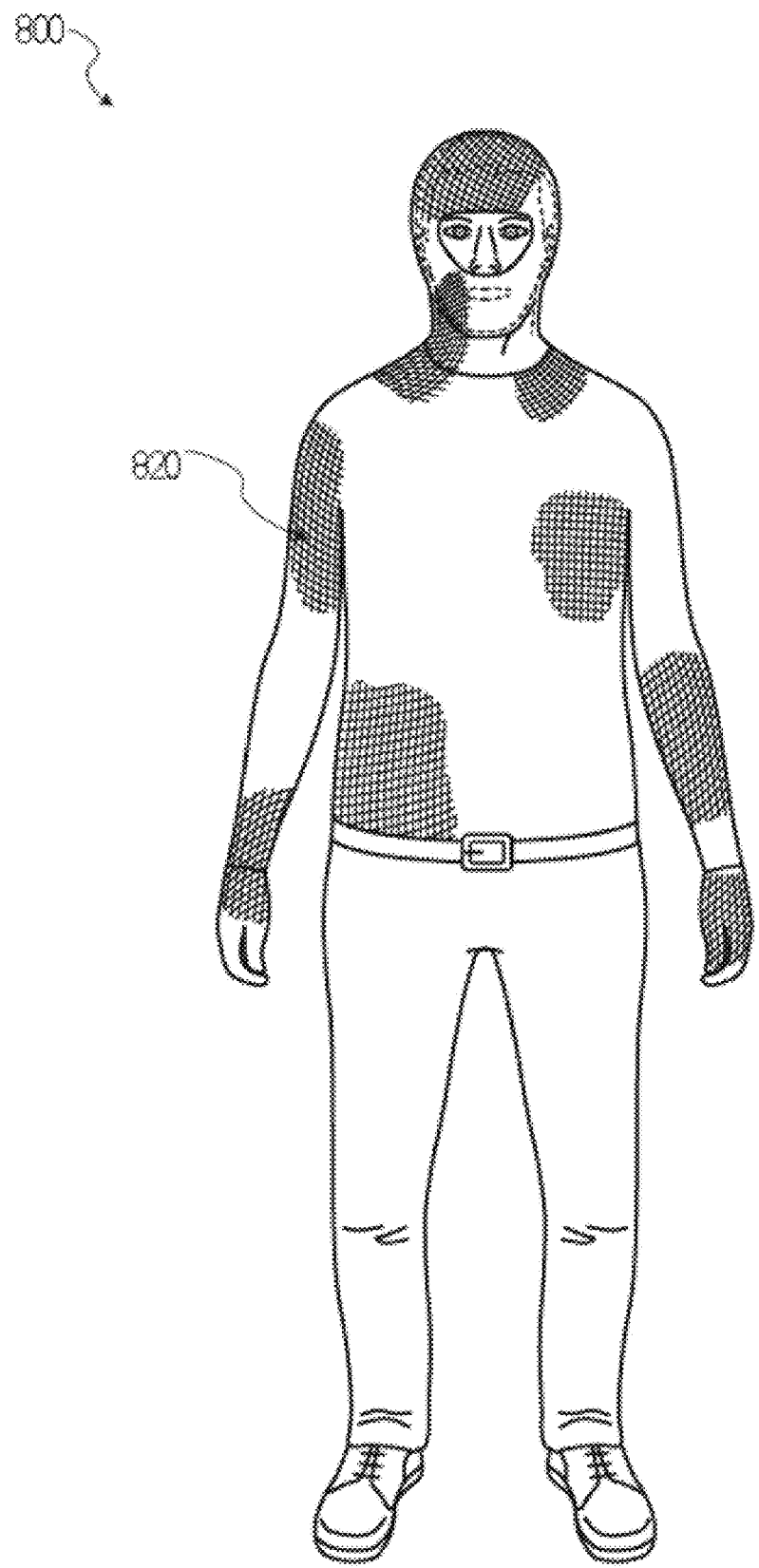
FIG. 8 is an illustration depicting a touch suit according to one example embodiment of a touch simulation system.

FIG. 8 is an illustration depicting a touch suit 800 according to one example embodiment of a touch simulation system. In one example embodiment, the person 106 wears the touch suit 800 and the touch suit 800 fits snugly against the person's 106 skin.

In one example embodiment, the virtual environment is a sword fight. In response to the representation of the person 106 in the virtual environment being hit by a sword, the virtual environment server 152 generates a touch indicator and transmits the touch indicator to the virtual module 320.

In response, the command module 340 generates a command that causes one or more of the micro-touch simulators to touch the skin of the person 106 consistent with the location of the sword in the virtual environment. Because the person is wearing a touch suit 800, the sword in the virtual environment may touch the representation of the person 106 anywhere and the touch may be simulated on a corresponding location on the touch suit, such as at location 820. In this way, the person 106 may experience a full battle experience and may be virtually hit by a sword almost anywhere that is covered by the touch suit 800.

In another example embodiment, the representation of the person 106 is shot by a gun and the touch simulation system 150 causes small section of micro-touch simulators to contact the person 106 consistent with the size of the bullet used in the virtual environment. In other examples, a touch suit 800 may be used to simulate military training, police training, martial arts training, or the like.

In another, more fantasy scenario, the virtual environment may be the person 106 fighting a dragon and the touches by the dragon in the virtual environment are simulated using the body suit. In this way, the user feels when and where the dragon has touched the person 106. Providing real-time touch simulation for the user in a virtual environment may heighten the perception of realism for the person 106.

Figure 9:
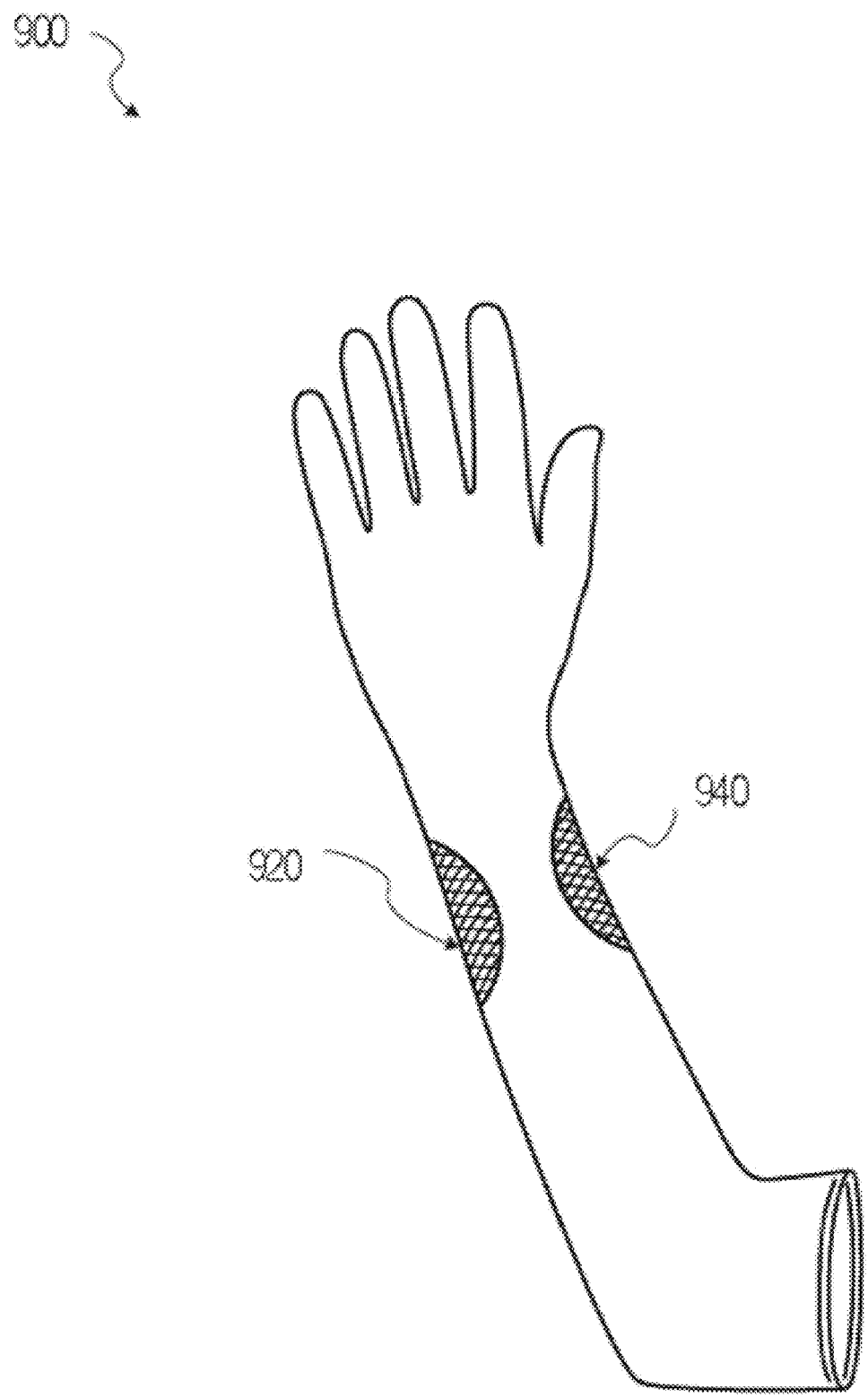
FIG. 9 is an illustration depicting a physical touch according to one example embodiment.

FIG. 9 is an illustration 900 depicting a physical touch according to one example embodiment. In another example, the touch indicator indicates two locations at opposing sides of the apparel. In this example, the touch indicator includes two distinct touches (e.g., touch 920, and a touch 940 to simulate a grabbing experience at the physical touch location.

In one example, the touches simulate a dog bite by moving one or more micro-touch simulators according to an arrangement of teeth for a dog. Furthermore, as the texture of teeth are applied to both sides of the article of apparel, the person 106 experience a simulated dog bite.

In another example embodiment, the touches simulate a grabbing experience for the person 106. For example, the texture of the touch may be consistent with a person's skin and the touches 920 and 940 may wrap more around the arm of the person 106. In this way, the person 106 feels as though his/her arm has been grabbed by another person.

Figure 10:
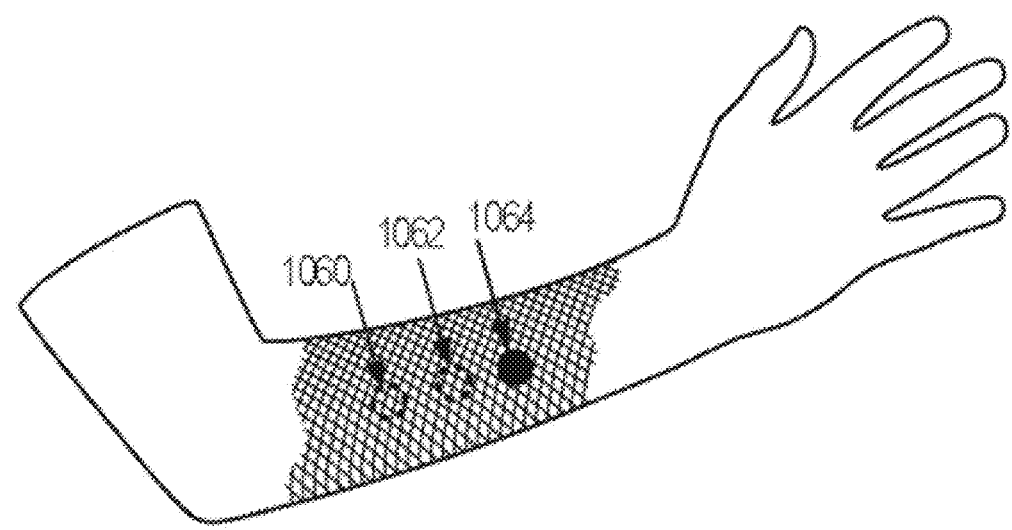
FIG. 10 is an illustration depicting a dynamic touch according to one example embodiment.

FIG. 10 is an illustration 1000 depicting a dynamic touch according to one example embodiment. According to this example embodiment, the command module 340 generates a command that activates sequential portions of the array of micro-touch simulators to simulate the touch moving across the person's skin.

In one example embodiment, the command module 340 generates a command that activates touch 1060, then activates a touch at location 1062, then activates touch at location 1064. In this example, the person 106 may feel as though the touch is moving from location 1060 to location 1064.

In one example, the command module 340 generates a command that activates the respective touches (1060, 1062, and 1064) at 250 millisecond intervals. Of course, other times may be used, and this disclosure is not limited in this regard.

In another example embodiment, the representation of the person 106 in the virtual environment is holding sand in his/her hand In response to the person 106 expanding his/her fingers allowing the sand to fall through, the command module 340 generates one or more commands to causing touching at the sides of the fingers and moving down. In this way, the touch simulation system can simulate the experience of letting sand fall through the fingers. In another example, in response to the person 106 physically closing his/her fingers, the virtual environment server 152 indicates that the sand sifting touches are no longer occurring and may transmit an indicator to the virtual module to indicate accordingly. In response, the execution module 360 suspends execution of the sand sifting touching commands.

Figure 11:
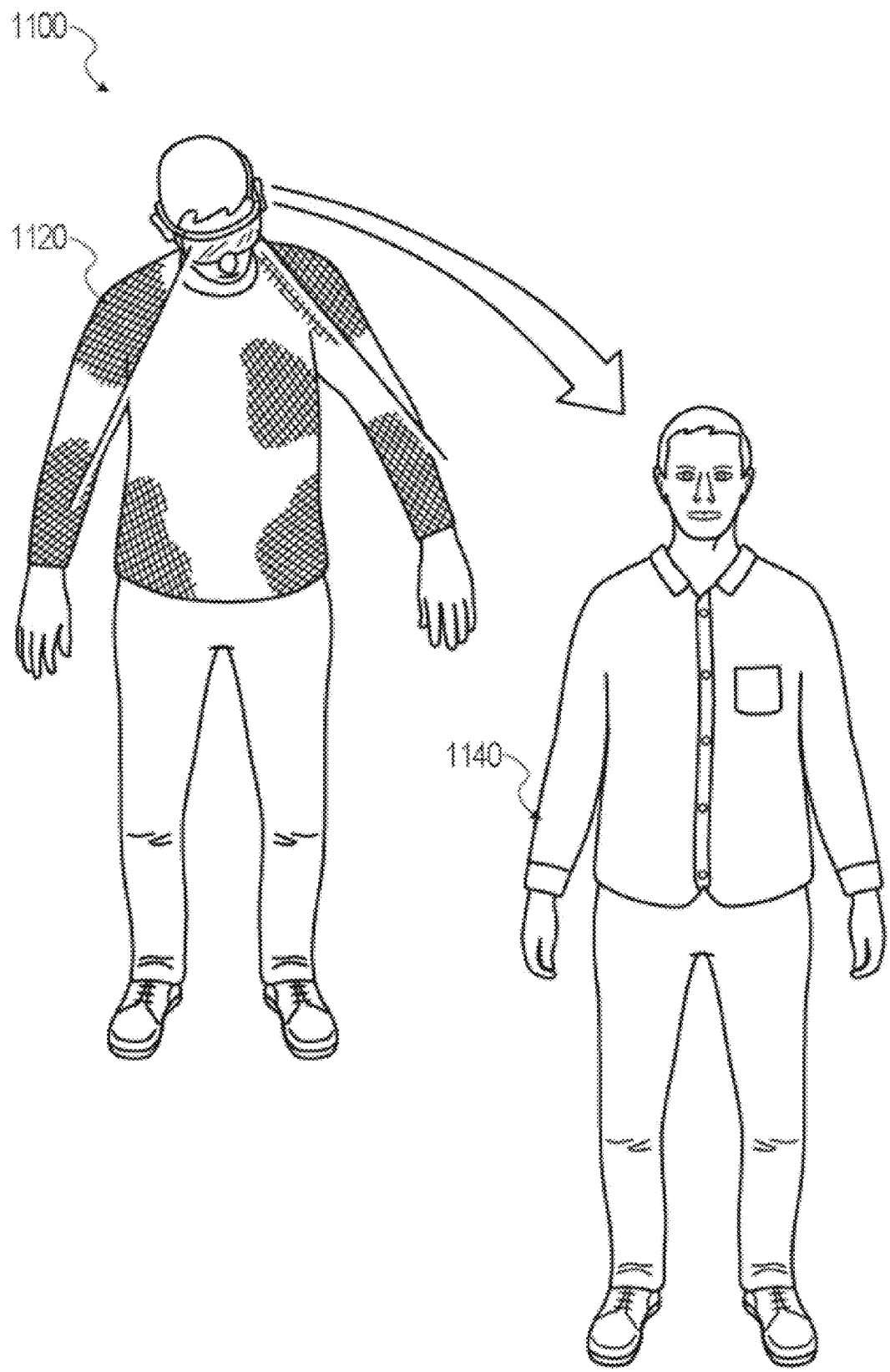
FIG. 11 is an illustration depicting one example embodiment of a touch simulation system according to one example embodiment.

FIG. 11 is an illustration 1100 depicting one example embodiment of a touch simulation system according to one example embodiment. In this example embodiment, the person 106 is wearing a touch suit 1120.

In one example embodiment, a representation of the person 106 in a virtual environment puts on an article of apparel according to movements by the person 106 in the physical world. In one example, the user is putting on a shirt 1140. In this example, as the person 106 slides the virtual shirt on, the virtual environment server 152 generates touch indicators that indicate where the shirt is touching the person 106. As the command module 340 generates the commands to implement the touches, and the execution module executes the commands, the touch suit 1120 will touch the person 106 accordingly and the person 106 will feel as though they are really putting on the shirt 1140 that is in the virtual environment. In this way, a person 106 may try virtually try on an article of apparel.

Figure 12:
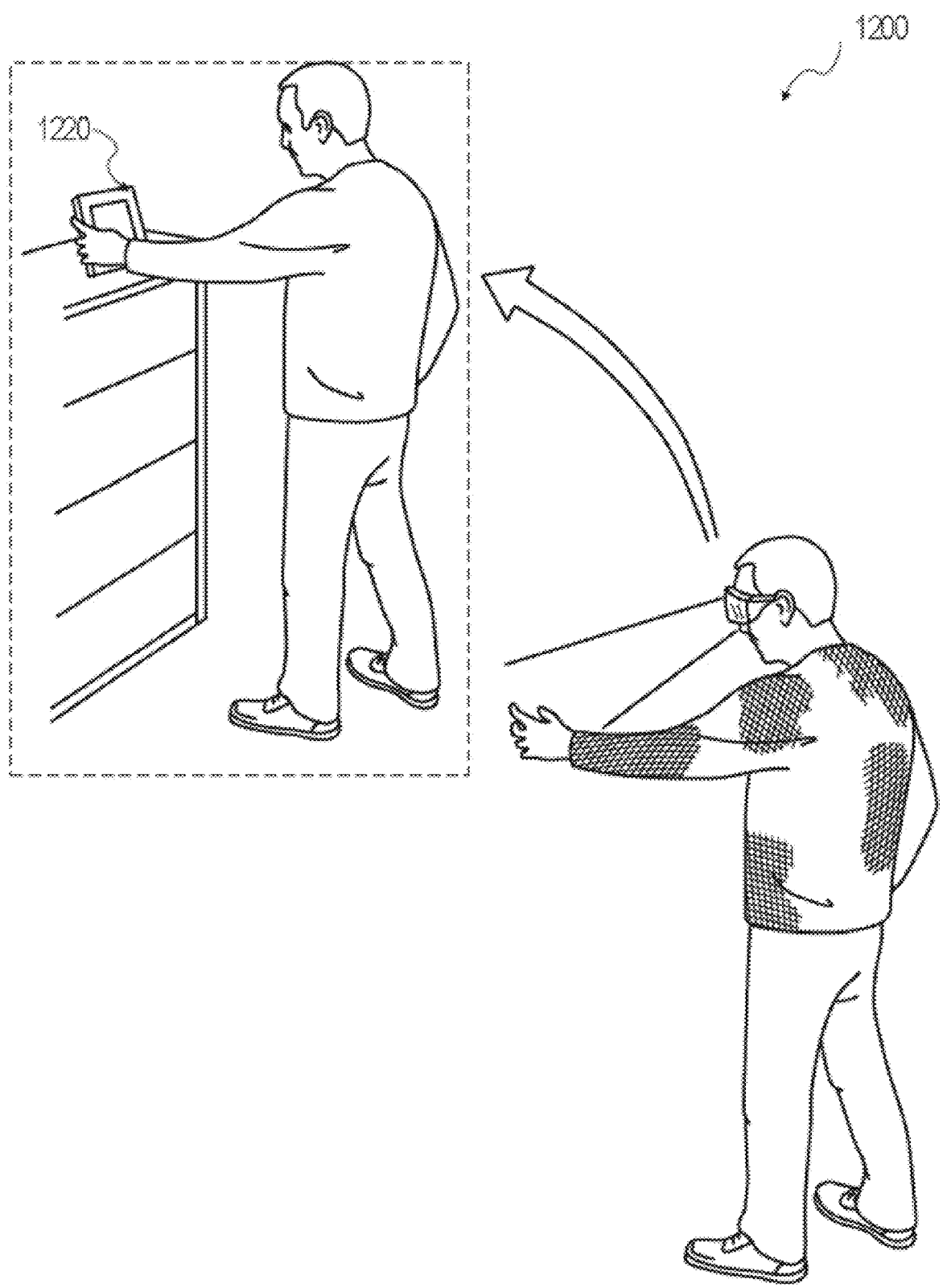
FIG. 12 is an illustration depicting one example embodiment of a touch simulation system.

FIG. 12 is an illustration 1200 depicting one example embodiment of a touch simulation system. In one example, a virtual environment includes an item that is available for purchase. A person 106 interacting with the virtual environment via the virtual environment server 152 may cause a representation of the person 106 to touch the item.

In response, the virtual environment server 152 transmits a touch indicator to the virtual module 320 that includes a location of the touch and a texture of the touch. In this example, the location of the touch is on the fingertips of the left hand and the texture of the touch is wood.

In response, the command module 340 generates a command that causes the micro-touch simulators at the tips of the fingers of the left hand to contact the person's 106 fingers according to the wood pattern. In this way, the person 106 may feel how the frame 1220 feels virtually. Such a scenario may make it much more convenient for a person 106 to virtually handle items for sale at remote locations before deciding to purchase the items.

Figure 13:
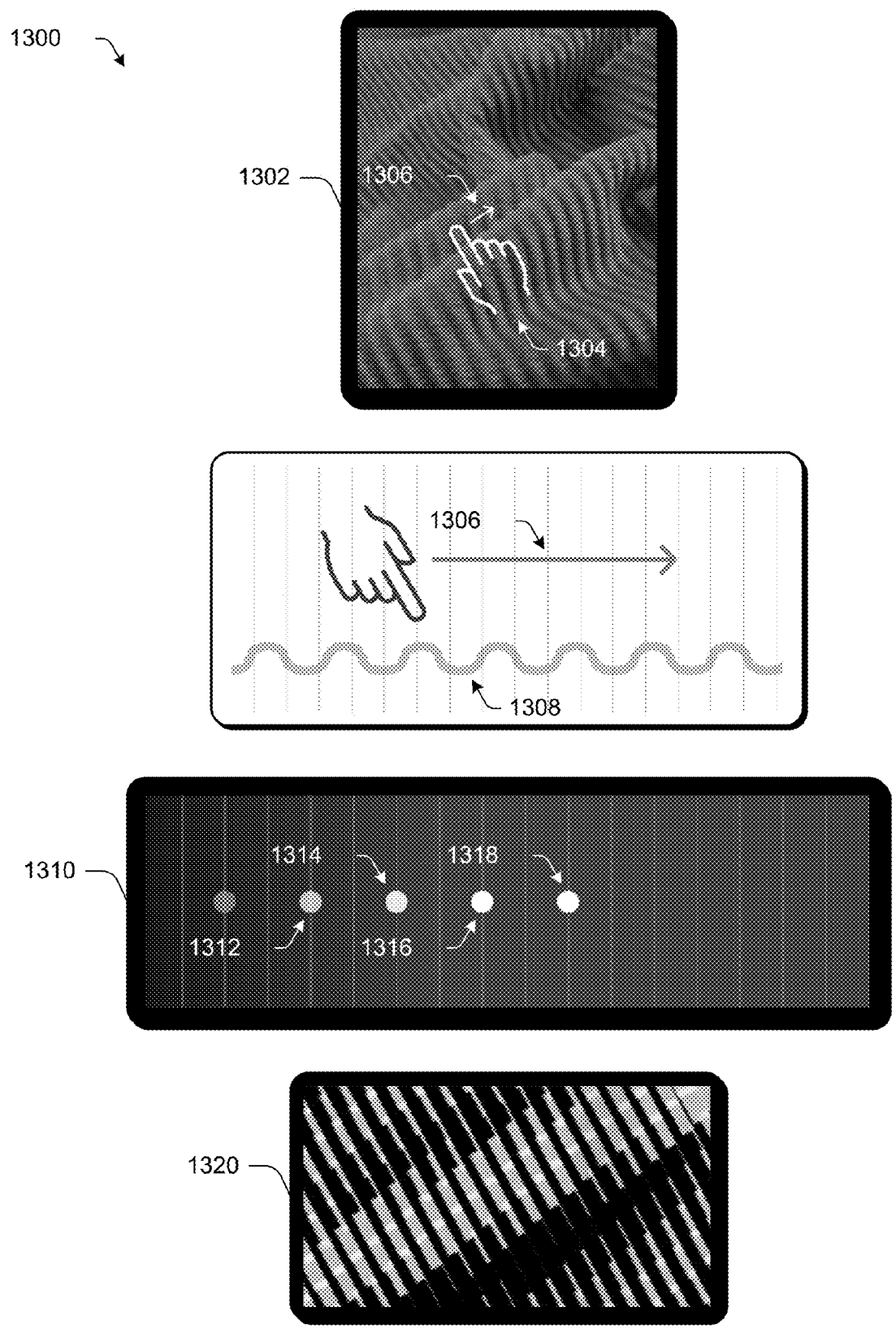
FIG. 13 illustrates an example of a touch simulation system leveraging a texture signature associated with an object to simulate touch in a virtual environment.

FIG. 13 illustrates an example 1300 of a touch simulation system leveraging a texture signature associated with an object to simulate touch in a virtual environment. In the illustrated example 1300, a user interacts with an object in a virtual environment 1302. Specifically, the virtual environment 1302 depicts an example implementation of a virtual environment provided by the virtual environment server 152 in which a user's hand 1304 (e.g., a hand of the person 106) contacts a surface of an object and moves across the surface of the object in a direction indicated by the arrow 1306.

In the virtual environment 1302, the object contacted by the user's hand 1304 represents corduroy fabric, which is characterized by threads woven together with thick vertical ribs spaced in a generally uniform pattern and has a distinctive feel compared to other fabrics such as leather, silk, denim, and so forth. In response to detecting the user's hand 1304 touching the corduroy object in the virtual environment 1302, the virtual environment server 152 identifies a location at which the user's hand 1304 contacts the corduroy object and transmits a touch indicator to the virtual module 320 that describes the location at which the user's hand 1304 contacts the corduroy object. In order to inform the virtual module 320 as to updated contact locations between the corduroy object and the user's hand 1304, the virtual environment server 152 continues to provide touch indicators to the virtual module 320 as the user's hand 1304 moves its contact location with the corduroy object along the direction indicated by the arrow 1306.

In addition to describing the location at which the user's hand 1304 contacts the corduroy object, the touch indicator transmitted from the virtual environment server 152 to the virtual module 320 includes information describing a texture signature of the corduroy object. As described herein, the texture signature of an object refers to a pattern of electrical signals that correspond to a perceived surface quality, feel, and/or dimensions of an object when physically contacted in the real world. In accordance with one or more implementations, the texture signature of an object is ascertained by the virtual environment server 152 from a database of textures, such as the database of textures included in the touch simulation system 150 as described above. In such an implementation, the touch simulation system 150 is configured to ascertain a corduroy texture from a texture database (e.g., database(s) 126) and output the database-defined corduroy texture as the texture signature for the corduroy object represented in virtual environment 1302.

Alternatively or additionally, the texture signature for an object refers to a texture that is measured for the specific object (e.g., a measured texture for the specific corduroy object represented in the virtual environment 1302 rather than a texture that generically represents corduroy objects as a whole). For instance, in an example implementation where the corduroy object represented in the virtual environment 1302 is an item for sale in a network-based marketplace, a seller of the item uses a texture analyzer (e.g., a texturometer) configured to simulate human interaction with the object and measure the texture experience. The measured texture signature of the object is associated with the object and then provided to the network-based marketplace by the seller of the object as part of listing information for the object, such that the virtual environment server 152 is configured to ascertain the object-specific texture for the object rather than the generic texture for the object as defined in a texture database. In some implementations, the object-specific texture as measured by a texture analyzer is communicated to a texture database for use in subsequently representing the object in a virtual environment and optionally at least one other object of a same material type.

In the illustrated example 1300, the texture signature for the corduroy object represented in virtual environment 1302 is depicted as waveform 1308. Waveform 1308 represents how the texture signature for the corduroy object encodes information into electrical signals describing the thick vertical ribs spaced in a generally uniform pattern that represent the real-world textural feel of corduroy. The texture signature for an object is useable by the command module 340 to generate a command that causes the micro-touch simulator array 380 to apply a haptic output on the person 106 that simulates the texture of the corduroy object as though the person 106 were physically touching the corduroy object represented in the virtual environment 1302.

For instance, the command module 340 generates a command that causes the micro-touch simulator array 380 to activate certain micro-touch simulators to exert force on the person 106 at locations that correspond to the contact between the person 106 and the object represented in the virtual environment 1302 (e.g., at one or more locations of a user's hand 1304 identified by the virtual module 320 as contacting the corduroy object). As an example, haptic output 1310 represents output of the texture signature for the corduroy object represented by the waveform 1308. Haptic output specifically includes haptic pulses 1312, 1314, 1316, and 1318 that each represent force applied via one or more micro-touch simulators on the person 106 as the user's hand 1304 moves in the direction indicated by arrow 1306 while contacting the corduroy object in the virtual environment 1302.

Specifically, the haptic output 1310 causes the micro-touch simulator array 380 to apply pressure to the person 106 when the virtual module 320 detects that the person 106 contacts the corduroy object at locations corresponding to raised portions of the corduroy object's vertical ribs represented by peaks in the waveform 1308. Conversely, the haptic output 1310 causes the micro-touch simulator array 380 to reduce pressure applied to the person 106 when the virtual module 320 detects contact with the corduroy object that moves from a location represented by a peak in the waveform 1308 to location represented by a valley in the waveform 1308.

In some implementations, the touch simulation system 150 is configured to output audio in conjunction with the haptic output 1310. For instance, rubbing corduroy has a distinctive whooshing sound. Consequently, while outputting the haptic output 1310 when the user's hand 1304 moves in the direction indicated by arrow 1306 while contacting the corduroy object in the virtual environment 1302, the touch simulation system 150 is configured to output audio simulating an auditory characteristic of interacting with the corduroy object. In implementations, the touch simulation system 150 discerns the auditory characteristic for the corduroy object based on the texture signature for the corduroy object, such that the touch simulation system 150 is capable of updating the audio output in real-time as a user interacts with the corduroy object.

Although the texture signature for the corduroy object represented in virtual environment 1302 is depicted by waveform 1308 as being only two-dimensional, this two-dimensional waveform representation is not limiting. Rather, this representation of the texture signature is intended to represent the specific haptic output provided by the touch simulation system 150 when the user's hand 1304 moves in the direction indicated by the arrow 1306 while touching the corduroy object, and is not so limited to the two-dimensional waveform. The texture signature of an object is configured to represent up to an entirety of a surface area of the object. For instance, the texture representation 1320 depicts an example of a texture signature for the corduroy object that covers a larger surface area of the corduroy object relative to the texture signature represented by waveform 1308 that pertains specifically to the texture of the corduroy object perceived by the user when traversing the corduroy object in the direction indicated by arrow 1306. In this manner, the touch simulation system 150 is provided with sufficient information to accurately simulate the texture of the corduroy object when the user's hand 1304 moves in a direction other than that indicated by the arrow 1306 while contacting the corduroy object in the virtual environment.

In some implementations, the texture representation 1320 illustrates a mapping of a texture signature for the corduroy object represented in virtual environment 1302 as mapped to a haptic output device, such as a trackpad, a touchscreen, a wearable device, and so forth. In the illustrated mapping, lighter portions of the texture representation 1320 correspond to raised portions of a corduroy surface. In this manner, when a user drags a finger across a surface of the trackpad, touchscreen, wearable device, or the like, haptic feedback is output as force or pressure on the user when the user's finger contacts a location of the trackpad corresponding to a lighter portion of the texture representation 1320.

Figure 14:
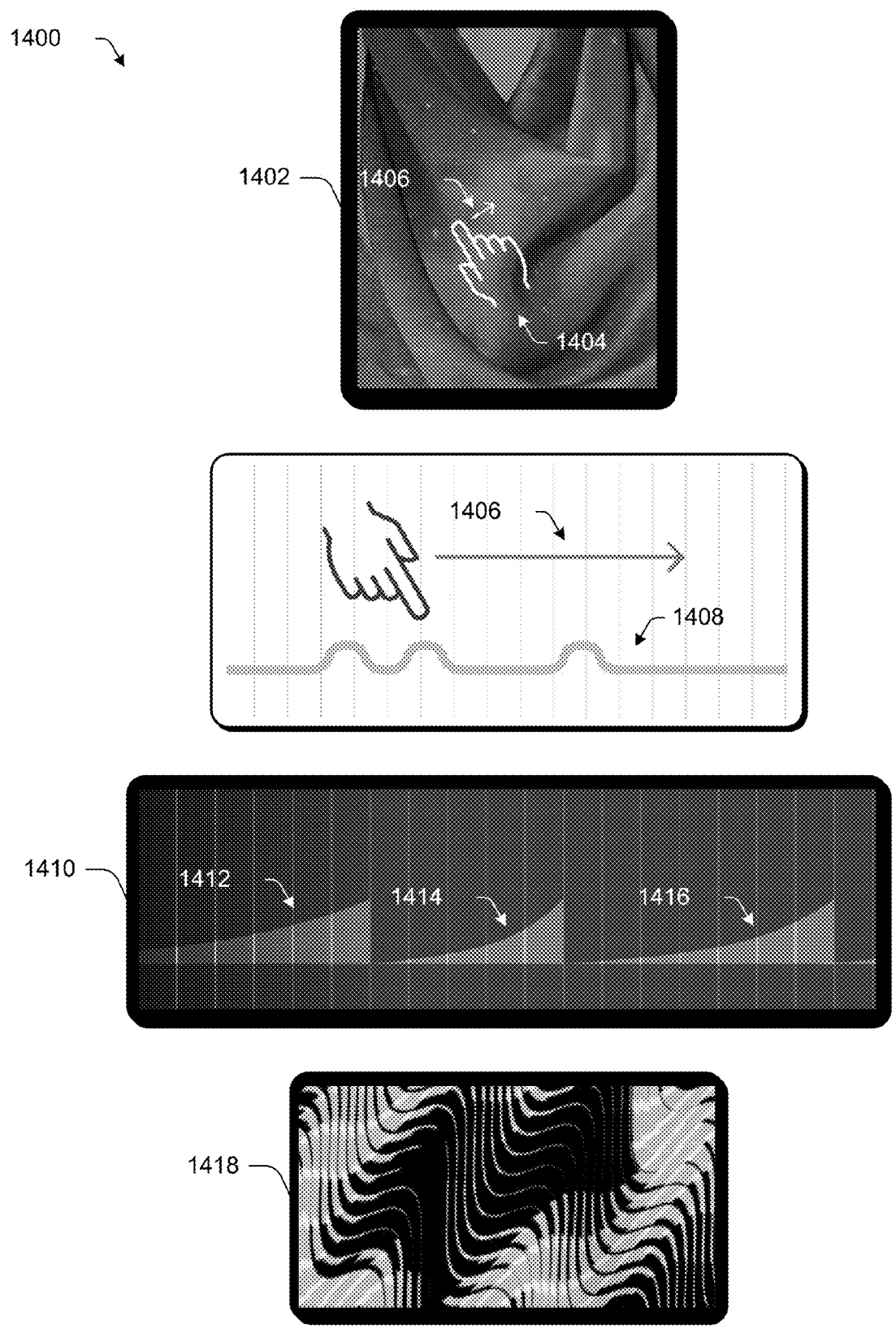
FIG. 14 illustrates an example of a touch simulation system leveraging a texture signature associated with an object to simulate touch in a virtual environment.

FIG. 14 illustrates an example 1400 of a touch simulation system leveraging a texture signature with an object to simulate touch in a virtual environment. In the illustrated example 1400, a user interacts with an object in a virtual environment 1402. Specifically, the virtual environment 1402 depicts an example implementation of a virtual environment provided by the virtual environment server 152 in which a user's hand 1404 (e.g., a hand of the person 106) contacts a surface of an object and moves across the surface of the object in a direction indicated by the arrow 1406.

In the virtual environment 1402, the object contacted by the user's hand 1404 represents silk fabric, which is characterized by a smooth texture in contrast to the vertical ribs of the corduroy fabric represented in the illustrated example 1300. In response to detecting the user's hand 1404 touching the silk object in the virtual environment 1402, the virtual environment server 152 identifies a location at which the user's hand 1404 contacts the silk object and transmits a touch indicator to the virtual module 320 that describes the location at which the user's hand 1304 contacts the silk object. In order to inform the virtual module 320 as to updated contact locations between the silk object and the user's hand 1404, the virtual environment server 152 continues to provide touch indicators to the virtual module 320 as the user's hand 1404 moves its contact location with the silk object along the direction indicated by the arrow 1406.

In addition to describing the location at which the user's hand 1404 contacts the silk object, the touch indicator transmitted from the virtual environment server 152 to the virtual module 320 includes information describing a texture signature of the silk object. As described above, the texture signature of the silk object is obtained from a texture database describing silk textures in general or from stored data describing the specific texture of the silk object represented in the virtual environment 1402 as measured by a texture analyzer.

In the illustrated example 1400, the texture signature for the silk object represented in virtual environment 1402 is depicted as waveform 1408. Waveform 1408 represents how the texture signature for the silk object encodes information into electrical signals describing where ridges, folds, bumps, or other contours of the silk object appear as specifically represented in the virtual environment 1402. The texture signature for an object is useable by the command module 340 to generate a command that causes the micro-touch simulator array 380 to apply a haptic output on the person 106 that simulates the texture of the silk object as though the person 106 were physically touching the silk object represented in the virtual environment 1402.

For instance, the command module 340 generates a command that causes the micro-touch simulator array 380 to activate certain micro-touch simulators to exert force on the person 106 at locations that correspond to the contact between the person 106 and the silk object represented in the virtual environment 1402. As an example, the micro-touch simulator array 380 exerts force at one or more locations of a user's hand 1404 identified by the virtual module 320 as contacting the silk object. Haptic output 1410 represents output of the texture signature for the silk object represented by the waveform 1408. Haptic output specifically includes haptic sweeps 1412, 1414, and 1416 that each represent a range of forces applied via one or more micro-touch simulators on the person 106 as the user's hand 1404 moves in the direction indicated by arrow 1406 while contacting the silk object.

For instance, the haptic output 1410 causes the micro-touch simulator array 380 to apply gradually increasing pressure to the person 106 when the virtual module 320 detects that the person 106 contacts one of the folds or ridges indicated by the peaks in waveform 1408 while moving in the direction indicated by the arrow 1406. As an example, the gradually increasing pressure represented by haptic sweep 1412 represents the touch simulation system 150 mimicking the feel of increased resistance due to gathering silk material as a user's finger approaches a ridge or fold. In a similar manner, the sharp decrease of pressure represented by a rightmost portion of the haptic sweep 1412 mimics the decrease of resistance as the user's finger passes the ridge or fold and returns to a smooth silk surface. In this manner, the haptic sweeps 1412, 1414, and 1416 simulate the feel of a texture of the silk object represented in virtual environment 1402 when the user's hand 1404 moves in the direction of the arrow 1406 across the three peaks represented in waveform 1408.

The touch simulation system 150 is further configured to output audio in conjunction with the haptic output 1410. For instance, rubbing silk has a scooping sound in the real world. Consequently, while outputting the haptic output 1410 when the user's hand 1404 moves in the direction indicated by arrow 1406 while contacting the silk object in the virtual environment 1402, the touch simulation system 150 is configured to output audio simulating an auditory characteristic of interacting with the silk object. In implementations, the touch simulation system 150 discerns the auditory characteristic for the silk object based on the texture signature for the silk object, such that the touch simulation system 150 is capable of updating the audio output in real-time as a user interacts with the silk object.

Although the texture signature for the silk object represented in virtual environment 1402 is depicted by waveform 1408 as being only two-dimensional, this representation is not limiting. Rather, this two-dimensional waveform representation of the texture signature is intended to represent the specific haptic output provided by the touch simulation system 150 when the user's hand 1404 moves in the direction indicated by the arrow 1406 while touching the silk object, and is not so limited to the two-dimensional waveform. As described herein, the texture signature of an object is configured to represent up to an entirety of a surface area of the object. For instance, the texture representation 1418 depicts an example of a texture signature for the silk object that covers a larger surface area of the silk object relative to the texture signature represented by waveform 1408. As noted above, waveform 1408 pertains specifically to the texture of the silk object perceived by the user when traversing the silk object in the direction indicated by arrow 1406. In this manner, the touch simulation system 150 is provided with sufficient information to accurately simulate the texture of the silk object when the user's hand 1404 moves in a direction other than that indicated by the arrow 1406 while contacting the silk object in the virtual environment.

In some implementations, the texture representation 1418 illustrates a mapping of a texture signature for the silk object represented in virtual environment 1402 as mapped to a haptic output device, such as a trackpad, where lighter portions of the texture representation 1420 correspond to ridges, folds, and the like in a silk surface. In this manner, when a user drags a finger across a surface of the trackpad, a touchscreen, a wearable device, and so forth, haptic feedback is output when the user's finger contacts a location of the trackpad, the touchscreen, the wearable device, or the like corresponding to a light portion of the texture representation 1418.

Figure 15:
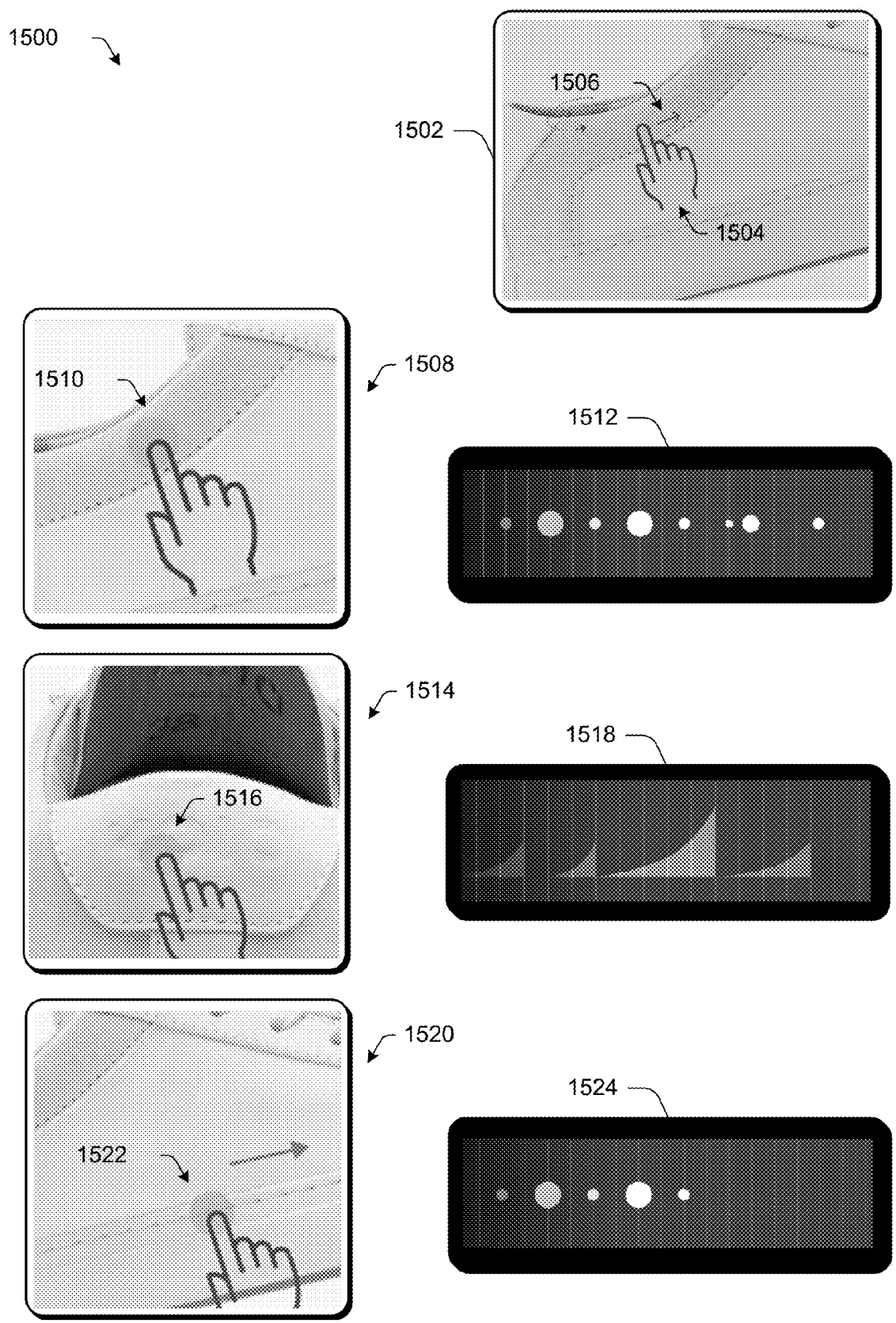
FIG. 15 illustrates an example of a touch simulation system leveraging multiple texture signatures associated with an object to simulate touch in a virtual environment.

FIG. 15 illustrates an example 1500 of a touch simulation system leveraging multiple texture signatures associated with an object to simulate touch in a virtual environment. In the illustrated example 1500, a user interacts with an object in a virtual environment 1502. Specifically, the virtual environment 1502 depicts an example implementation of a virtual environment provided by the virtual environment server 152 in which a user's hand 1504 (e.g., a hand of the person 106) contacts a surface of an object and moves across the surface of the object in a direction indicated by the arrow 1506. In contrast to the example implementations illustrated and described above with respect to FIGS. 13 and 14, where the object in a virtual environment is associated with a texture signature for a single type of material, the object in the virtual environment 1502 comprises multiple different textures.

In the virtual environment 1502, the object contacted by the user's hand 1504 represents a shoe constructed from multiple different materials. When the user's hand 1504 moves in the direction indicated by the arrow 1506 and in other directions while contacting the shoe, the point(s) of contact between the user's hand 1504 and the shoe traverses different textures in the virtual environment. To simulate the feeling of these different textures, in response to detecting the user's hand 1504 touching the shoe in the virtual environment 1502, the virtual environment server 152 identifies a location at which the user's hand 1504 contacts the shoe. The virtual environment server 152 then transmits a touch indicator to the virtual module 320 that describes the location at which the user's hand 1504 contacts the shoe, and continues to provide updated touch indicators to the virtual module 320 as the user's hand 1504 (and/or other parts of the user) changes contact locations while interacting with the shoe in the virtual environment 1502.

In addition to describing the location at which the user's hand 1504 contacts the shoe, the touch indicator transmitted from the virtual environment server 152 to the virtual module 320 includes information describing a texture signature of the shoe. The texture signature of the shoe indicates a particular texture associated with the location of the shoe contacted by the user's hand 1504. In some implementations, the texture signature for the object is a three-dimensional model of the object with each point on a surface of the three-dimensional model including information representing material properties of the surface of the object (e.g., the shoe) at the corresponding point.

In some implementations, the texture signature for the shoe is obtained from a texture database entry that describes texture signatures for multiple objects of a common type (e.g., a texture signature for all shoes of a certain style and design). Alternatively or additionally, the texture signature for the shoe is particular to the specific shoe represented in the virtual environment 1502. For instance, in an example implementation where the virtual environment 1502 enables potential purchasers to interact with a shoe before purchasing the shoe, the texture signature is measured by a seller of the shoe using a texture analyzer. By representing the specific object, the texture signature is configured to encode information describing a quality of the shoe that cannot be gleaned from a texture signature representing multiple shoes of a common type. For instance, the texture signature measured using a texture analyzer for the particular shoe captures how materials (e.g., soles, leather, laces, etc.) break down or feel different from the shoe relative to an "out-of-the-box" condition due to wear. Alternatively or additionally, the texture signature captures defects in, and damages to, (e.g., tears, rips, holes, etc.) the object. In this manner, the texture signature for an object encodes comprehensive information for simulating interaction with the object in a manner that mimics real-world interaction with object textures.

The illustrated example depicts various detailed views of the shoe represented in the virtual environment 1502 to demonstrate how different textures affect a haptic output provided by the touch simulation system 150. For instance, view 1508 depicts a region 1510 of the shoe having a pebbled leather surface and a haptic output 1512 for the portion of the texture signature of the shoe that corresponds to region 1510. The haptic output 1512 includes a plurality of haptic pulses of varying forces, represented by different sizes of the dots depicted in the haptic output 1512, such that the haptic output 1512 causes the micro-touch simulator array 380 to simulate contacting the pebbled leather surface of the shoe at region 1510.

View 1514 depicts a region 1516 of the shoe having a logo embossed on a leather surface and a haptic output 1518 for the portion of the texture signature for the shoe that corresponds to region 1516. The haptic output 1518 includes a plurality of haptic sweeps of varying magnitude, represented by different peak heights of the ramps illustrated in the haptic output 1518. Each of the plurality of haptic sweeps in haptic output 1518 represents a degree of force to be output by the micro-touch simulator array 380 as simulating resistance by a portion of the embossed logo exerted on the user's hand 1504 as the user's hand 1504 brushes the region 1516 in the direction indicated by arrow 1506.

View 1520 depicts a region 1522 of stitching attaching a rubber trim area to an upper portion of the shoe and a haptic output 1524 for the portion of the texture signature for the shoe that corresponds to region 1522. The haptic output 1524 includes a plurality of haptic pulses of varying magnitudes, represented by different sizes of the dots depicted in the haptic output 1524. In this manner, the haptic output 1524 causes the micro-touch simulator array 380 to simulate contacting individual stitches and the rubber trim area of the shoe at region 1522, such that the person 106 can feel the stitching and rubber trim of the shoe via the virtual environment 1502 without having to physically hold the shoe.

Thus, as illustrated by the example 1500, the touch simulation system 150 is configured to simulate different textures of a single object by providing haptic outputs that correspond to specific locations of the object being touched by the person 106. In some implementations, the touch simulation system 150 simultaneously outputs different haptic feedbacks. For instance, in an example scenario where a left hand of the person 106 contacts region 1510 while a right hand of the person 106 contacts region 1522, the touch simulation system 150 is configured to apply haptic output 1512 at the left hand while applying haptic output 1524 at the right hand In addition to simulating object texture, the touch simulation system 150 is configured to simulate other material properties of an object in a virtual environment.

Figure 16:
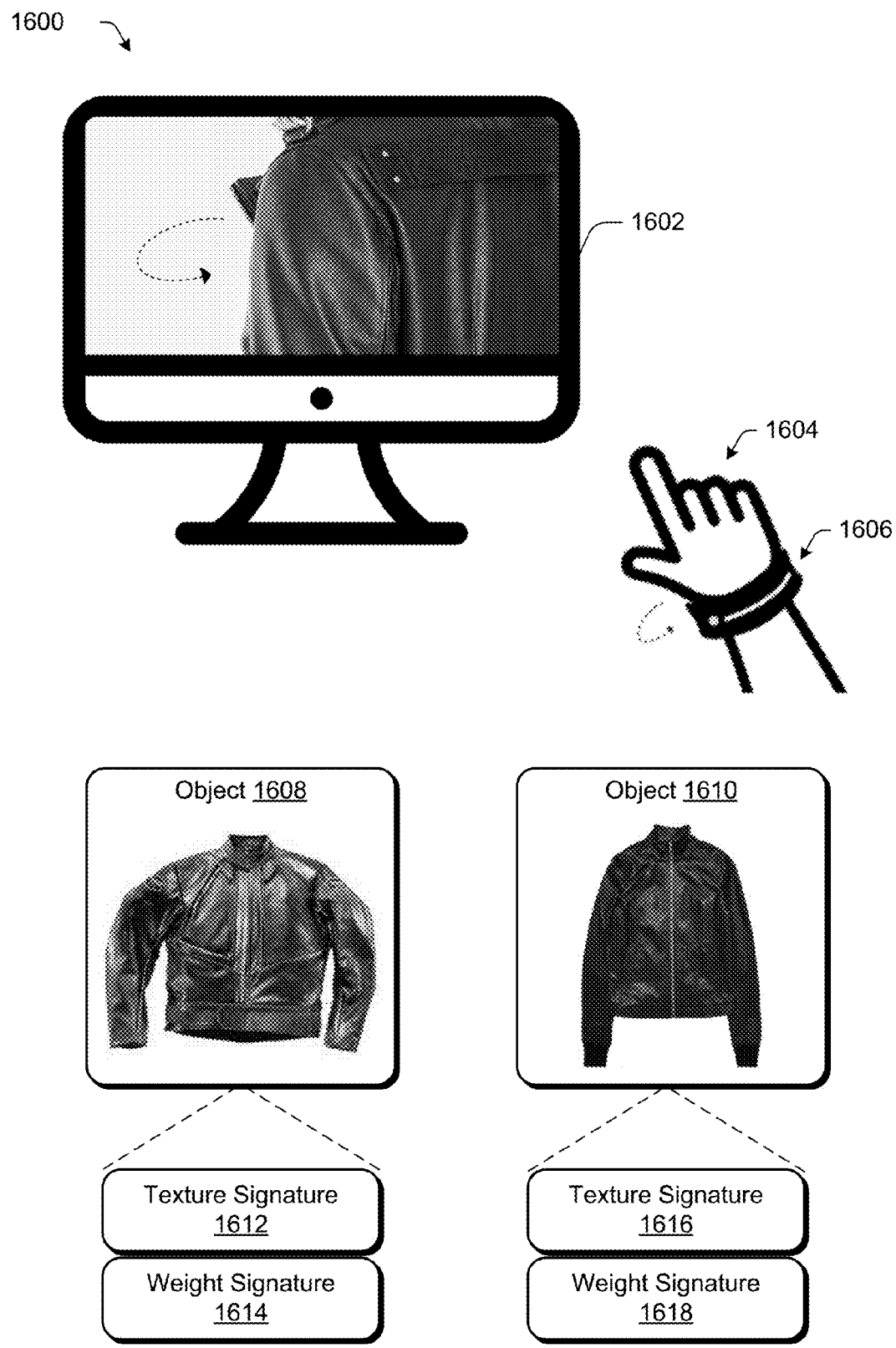
FIG. 16 illustrates an example of a touch simulation system leveraging a weight signature associated with an object to represent the object in a virtual environment.

FIG. 16 illustrates an example 1600 of a touch simulation system leveraging a weight signature associated with an object to simulate touch in a virtual environment. In the illustrated example 1600, a user interacts with an object in a virtual environment 1602. Specifically, the virtual environment 1602 depicts an example implementation of a virtual environment provided by the virtual environment server 152 in which a user 1604 (e.g., a hand of the person 106) manipulates the object in the virtual environment 1602 via gesture input detected by a wearable device 1606. For instance, in an example implementation where the user 1604 makes a rotating motion while wearing the wearable device 1606, the rotating motion causes the object displayed in the virtual environment 1602 to rotate. Although described and illustrated with respect to a rotating motion, the gesture input and corresponding display in the virtual environment 1602 is not so limited to rotation and is representative of any suitable combination of gesture input and virtual environment 1602 output.

In some implementations, the object is represented in the virtual environment based on a weight signature associated with the object. As described herein, a weight signature for an object is representative of information describing a weight of a portion or entirety of the object being represented in the virtual environment. For instance, in an implementation where a couch is represented in a virtual environment, the entire couch is represented by an overall weight signature that includes weights for the couch frame, cushions, and fabric covering the frames and cushions. The individual components in turn are represented by individual weight signatures, such that the touch simulation system 150 is able to represent the couch cushions as being lighter than the couch frame. In some implementations, the weight signature for an object is derived from one or more texture signatures for the object. For instance, in an example implementation where a texture signature for an object indicates a certain type of fabric, the weight signature for the object is derived from a gauge of the certain type of fabric.

In some implementations, different portions of a single object are associated with different weight signatures. For instance, in an implementation where the object is a jacket with a vest portion made of nylon and insulated with synthetic down and sleeves made of canvas, the vest portion is associated with a first weight signature and the sleeves are associated with second and third weight signatures, respectively. By accurately representing object weight(s) using weight signatures, the touch simulation system 150 more accurately represents objects in a virtual environment.

In the illustrated example 1600, object 1608 is representative of a first motorcycle jacket and object 1610 is representative of a second motorcycle jacket. Some motorcycle jackets are designed for fashion with style as a primary design element while other motorcycle jackets are designed for rider protection with safety as a primary design element. As a corollary, motorcycle jackets designed for safety are generally heavier than those designed for fashion. While it is easy to discern this difference when physically trying on jackets in a traditional brick-and-mortar store, it is difficult to accurately represent weight differences in a virtual environment. To address this problem, the touch simulation system 150 defines each of the motorcycle jackets represented in the illustrated example 1600 using both texture and weight signatures. Specifically, object 1608 is defined by a texture signature 1612 and a weight signature 1614 and object 1610 is defined by a texture signature 1616 and a weight signature 1618.

In an example implementation where rotational movement detected by the wearable device 1606 causes a displayed representation of the respective object to rotate in virtual environment 1602, the touch simulation system 150 visualizes rotation of the object based on its associated signatures. For example, consider a scenario where the texture signatures 1612 and 1616 are the same but weight signature 1614 indicates the object 1608 is heavier than the weight signature 1618 of object 1610. In this example scenario, the same rotational input detected by the wearable device 1606 might cause the touch simulation system 150 to rotate object 1608 more slowly than object 1610 in response to detecting the rotational input, thereby conveying which object is heavier and might require more force to rotate.

In a similar manner, movement of the object 1608 in the virtual environment 1602 might be displayed as being stiff compared to a suppleness of the object 1610 when subjected to the same movement (e.g., being thrown over a user's shoulder). In this manner, touch simulation system 150 is configured to represent, in the virtual environment 1602, object properties that would be experienced by physically interacting with the object in the real-world. The weight signature of an object is also useable by the touch simulation system 150 to output haptic feedback for the object.

For instance, in an example implementation where the person 106 wears a touch suit 800 to virtually try-on objects 1608 and 1610, the weight signatures 1614 and 1618 are used to affect an amount of pressure applied to the person 106 at one or more locations (e.g., location 820) detected to be contacted when trying on the object. In this manner, when the person 106 tries on the object 1608, the weight signature 1614 causes the touch suit 800 to exert additional force on the person 106 relative to that exerted based on the weight signature 1618 for object 1610.

Thus, the weight signature for an object is useable to affect both a visual representation of the object in a virtual environment as well as haptic feedback when a user interacts with the object in the virtual environment. As additional examples, weight signatures are useable to convey a respective weight, which is of particular importance to certain products, such as purses, bikes, and so forth. Encoding information describing an object's weight into a weight signature enables the touch simulation system 150 to accurately simulate material properties impacting an object's weight in addition to the object's texture, thereby providing a more comprehensive virtual representation of the object. In addition to simulating object texture and weight, the touch simulation system 150 is configured to simulate other material properties of an object represented in a virtual environment.

Figure 17:
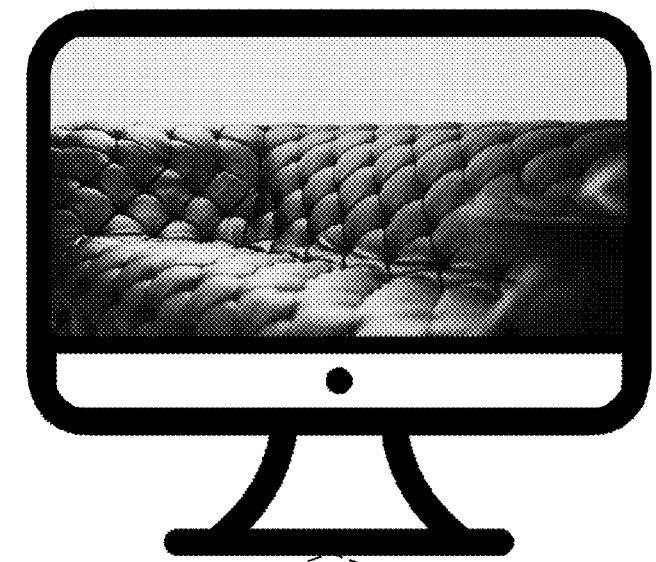
FIG. 17 illustrates an example of a touch simulation system leveraging a scent signature associated with an object when representing the object in a virtual environment.
Figure 17:
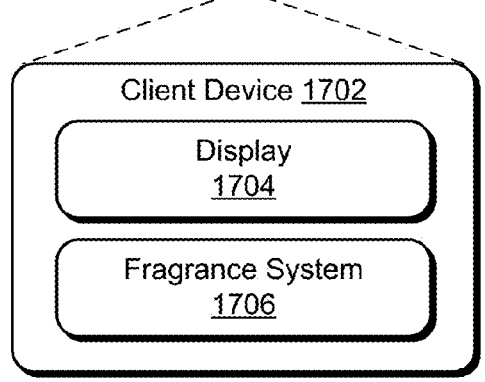
Figure 17:
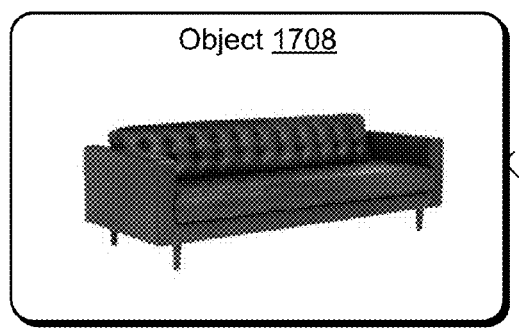
Figure 17:
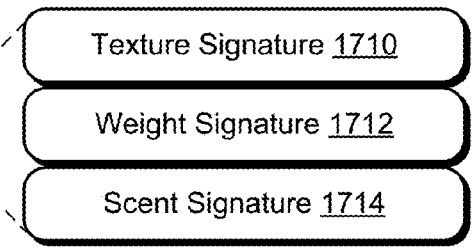

FIG. 17 illustrates an example 1700 of a touch simulation system leveraging a scent signature associated with an object when representing the object in a virtual environment. In the illustrated example 1700, client device 1702 includes a display 1704 and a fragrance system 1706. The display 1704 is configured to render an object 1708 being represented in a virtual environment. In this manner, the client device 1702 is representative of any device implementing the touch simulation system 150 described herein, such as the virtual environment goggles 230 illustrated in FIG. 2. The fragrance system 1706 is representative of a device configured to store and emit one or more fragrance compositions, such as one or more fragrances associated with an object. As an example, the fragrance system 1706 is configured to store one or more fragrance compositions as liquids and emit individual ones or combinations of the one or more fragrance compositions by vaporizing and aerosolizing the liquid fragrance compositions in a controlled manner.

For instance, object 1708 is representative of a leather couch having a texture signature 1710 and a weight signature 1712, as described above, which are useable by the touch simulation system 150 to represent the object 1708 in a virtual environment. In addition, the object 1708 is associated with a scent signature 1714. The scent signature 1714 is representative of information encoded into the object 1708 that describes a fragrance composition stored by the 1706 associated with the object 1708. In this manner, when the touch simulation system 150 detects interaction with the object 1708 in a virtual environment, the touch simulation system 150 causes the fragrance system 1706 to output the fragrance composition associated with the object 1708.

For instance, in response to detecting the person 106 approaching the object 1708 in a virtual environment, the touch simulation system 150 causes the fragrance system 1706 to emit a fragrance composition for the object 1708 in response to detecting the person 106 being within a threshold distance from the 1708. In this manner, the touch simulation system 150 is configured to simulate interaction with an object in a virtual environment based on various properties encoded as one or more of a texture signature, a weight signature, or scent signature for the object. In some implementations, different signatures (e.g., texture, weight, and scent) are each associated with information that prioritizes a relative importance of each signature for the object. For instance, the object 1708 includes information indicating that the weight signature 1712 is most important, that the texture signature 1710 is of second-most importance, and that the scent signature 1714 is of least importance when representing the object 1708 in a virtual environment.

The command module 340 is configured to generate commands that simulate interaction with the object 1708 based on this relative importance. As an example, the command module 340 generates a command to simulate the scent of the object 1708 when the person 106 is within a threshold distance from the object 1708, generate a command to simulate a texture of the object 1708 when the person 106 touches the object 1708, and generate a command to simulate a weight of the object 1708 when the person 106 imparts sufficient force that moves the representation of the object 1708.

Figure 18:
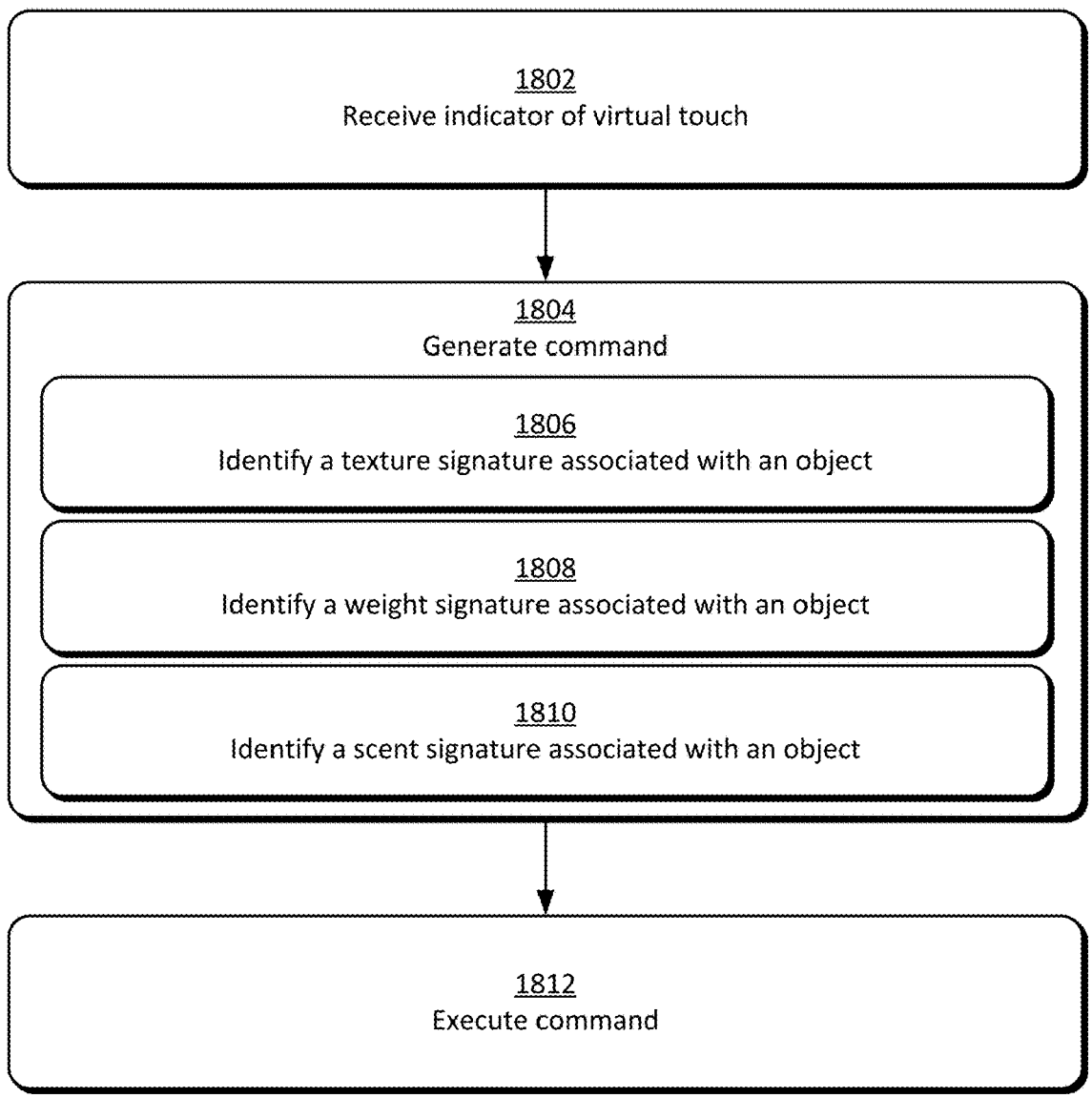
FIG. 18 is a flow chart diagram illustrating a method for simulating a virtual touch according to one example embodiment.

FIG. 18 is a flow chart diagram illustrating a method 1800 for simulating a virtual touch according to one example embodiment. Operations in the method 1800 may be performed by the system 150, using modules described above with respect to FIG. 3. As shown in FIG. 18, the method 1800 includes operations 1802, 1804, and 1810.

In one example embodiment, the method 1800 begins at operation 1802, the virtual module receives an indicator of a touch in a virtual environment. In another example embodiment, the indicator includes a physical touch location and a texture of the touch.

The method 1800 continues at operation 1804 and the command module 340 generates one or more commands to simulate interaction with an object represented in a virtual environment. In some implementations, the command module 340 generates one or more commands by identifying a texture signature associated with the object (operation 1806) and generating the command based on the texture signature. For instance, in response to detecting contact with an object at a physical touch location 220, the command module 340 generates a command to activate one or more micro-touch simulators in an array of micro-touch simulators according to the texture signature of the object contacted by the physical touch location 220. In one example embodiment, the micro-touch simulators operate as part of a physical touch interface for a user of the virtual environment. In one example embodiment, the physical touch interface is an article of apparel as described herein.

Alternatively or additionally, the command module 340 generates one or more commands by identifying a weight signature associated with the object (operation 1808) and generating the command based on the weight signature. For instance, in response to detecting contact with an object at a physical touch location 220, the command module 340 generates a command to activate one or more micro-touch simulators in an array of micro-touch simulators according to the weight signature of the object contacted by the physical touch location 220. For instance, the command module 340 generates a command for the touch suit 800 to simulate a weight of an article of apparel being virtually tried-on by the person 106.

Alternatively or additionally, the command module 340 generates one or more commands by identifying a scent signature associated with the object (operation 1810) and generating the command based on the scent signature. For instance, in response to detecting a threshold proximity between a person 106 and an object in a virtual environment, the command module 340 generates a command to cause a fragrance system 1706 to emit a fragrance composition associated with the object.

The method 1800 continues at operation 1812 and the execution module 360 executes the one or more commands to simulate interaction by the person 106 with the object in the virtual environment.

Figure 19:
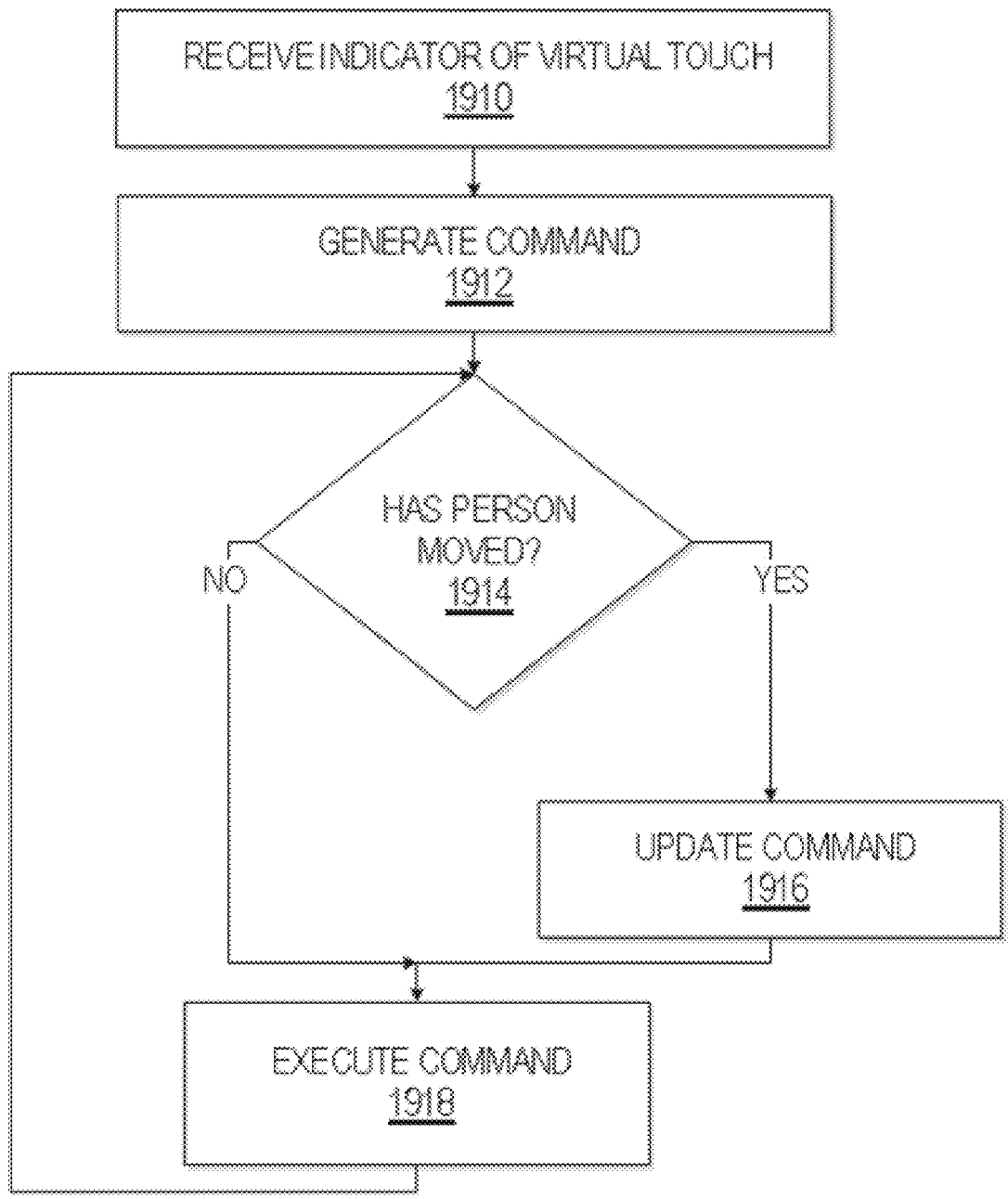
FIG. 19 is a flow chart diagram illustrating another method for simulating a virtual touch, according to one example embodiment.

FIG. 19 is a flow chart diagram illustrating another method 1900 for simulating a virtual touch, according to one example embodiment. Operations in the method 1900 may be performed by the system 150, using modules described above with respect to FIG. 3. As shown in FIG. 19, the method 1900 includes operations 1910, 1912, 1914, 1916, and 1918.

In one example embodiment, the method 1900 begins and at operation 1910, the virtual module receives an indicator of a touch in a virtual environment. In another example embodiment, the indicator includes a physical touch location and a texture of the touch.

The method 1900 continues at operation 1912 and the command module 340 generates a command to simulate the texture of the touch at the physical touch location by moving one or more micro-touch simulators in an array of micro-touch simulators according to the texture of the touch at the physical touch location. In one example embodiment, the micro-touch simulators operate as part of a physical touch interface for a user of the virtual environment. In one example embodiment, the physical touch interface is an article of apparel as described herein.

The method 1900 continues at operation 1914 and the virtual module 320 determines whether the person 106 has moved away from the touch so that the touch no longer reflects the state of objects in the virtual environment. In one example, the virtual module 320 receives an indicator from the virtual environment server 152 indicating that the touch is no longer valid.

In response to the person 106 not having moved, the method continues at operation 1918 and the execution module 360 executes the command to simulate the touch at the physical touch location for the person 106. The method 1900 then continues at operation 1914.

In response to the person 106 moving, the method 1900 continues at operation 1916 and the command module 340 updates the command to reflect a change in the touch. In one example, the virtual module 320 receives an indicator from a virtual environment server 152 that updates the status of the touch. The method 1900 then continues at operation 1918.

Machine and Software Architecture

The modules, methods, applications and so forth described in conjunction with FIGS. 1-19 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 20:
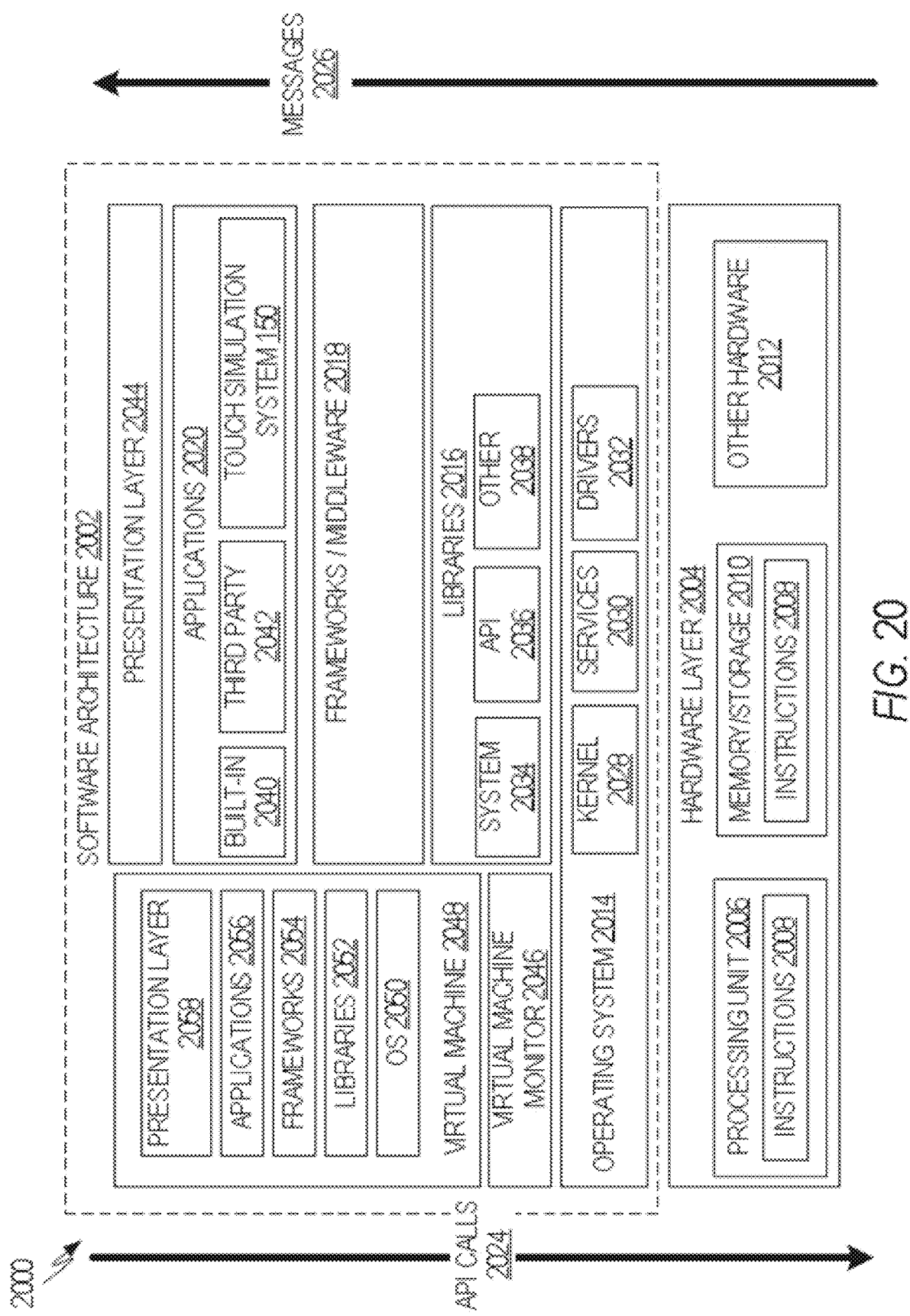
FIG. 20 is a block diagram illustrating an example of a software architecture that may be installed on a machine, according to some example embodiments.

FIG. 20 is a block diagram illustrating an example of a software architecture 2000 that may be installed on a machine, according to some example embodiments. The software architecture 2000 may be used in conjunction with various hardware architectures herein described. FIG. 20 is merely a non-limiting example of a software architecture and it will be appreciated that many other architectures may be implemented to facilitate the functionality described herein. The software architecture 2000 may be executing on hardware such as machine 2100 of FIG. 21 that includes, among other things, processors 2110, memory 2130, and I/O components 2150. A representative hardware layer 2004 is illustrated and can represent, for example, the machine 2100 of FIG. 21. The representative hardware layer 2004 comprises one or more processing units 2006 having associated executable instructions 2008. Executable instructions 2008 represent the executable instructions of the software architecture 2000, including implementation of the methods, modules, and so forth of FIG. 3. Hardware layer 2004 also includes memory and/or storage modules 2010, which also have executable instructions 2008. Hardware layer 2004 may also comprise other hardware as indicated by 2012, which represents any other hardware of the hardware layer 2004, such as the other hardware illustrated as part of machine 2100.

In the example architecture of FIG. 20, the software 2002 may be conceptualized as a stack of layers where each layer provides particular functionality. For example, the software 2002 may include layers such as an operating system 2014, libraries 2016, frameworks 2018, applications 2020, and presentation layer 2022. Operationally, the applications 2020 and/or other components within the layers may invoke API calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a framework 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. In one specific embodiment, the virtual module 320, the command module 340, and the execution module 360 are implemented as an application 2020. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and/or three dimensional graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system or platform. In one example embodiment, at least a portion of the touch simulation system 150 is implemented as middleware.

The applications 2020 include built-in applications 2040 and/or third-party applications 2042. Examples of representative built-in applications 2040 may include, but are not limited to, a contacts application, a browser application, a book reader application, a location application, a media application, a messaging application, and a game application, or other, or the like. Third party applications 2042 may include any of the built-in applications as well as a broad assortment of other applications. In a specific example, the third-party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 2042 may invoke the API calls 2024 provided by the mobile operating system such as operating system 2014 to facilitate functionality described herein.

The applications 2020 may utilize built in operating system functions (e.g., kernel 2028, services 2030, and/or drivers 2032), libraries (e.g., system 2034, API libraries 2036, and other libraries 2038), frameworks 2018 to create user interfaces to interact with users of the system. Alternatively, or additionally, in some systems, interactions with a user may occur through a presentation layer, such as presentation layer 2044. In these systems, the application/module "logic" can be separated from the aspects of the application/module that interact with a user.

Some software architectures utilize virtual machines. In the example of FIG. 20, this is illustrated by virtual machine 2048. A virtual machine creates a software environment where applications/modules can execute as if they were executing on a hardware machine (such as the machine of FIG. 21, for example). A virtual machine is hosted by a host operating system (operating system 2014 in FIG. 20) and typically, although not always, has a virtual machine monitor 2046, which manages the operation of the virtual machine as well as the interface with the host operating system (i.e., operating system 2014). A software architecture executes within the virtual machine such as an operating system 2050, libraries 2052, frameworks/middleware 2054, applications 2056 and/or presentation layer 2058. These layers of software architecture executing within the virtual machine 2048 can be the same as corresponding layers previously described or may be different.

Example Machine Architecture and Machine-Readable Medium

Figure 21:
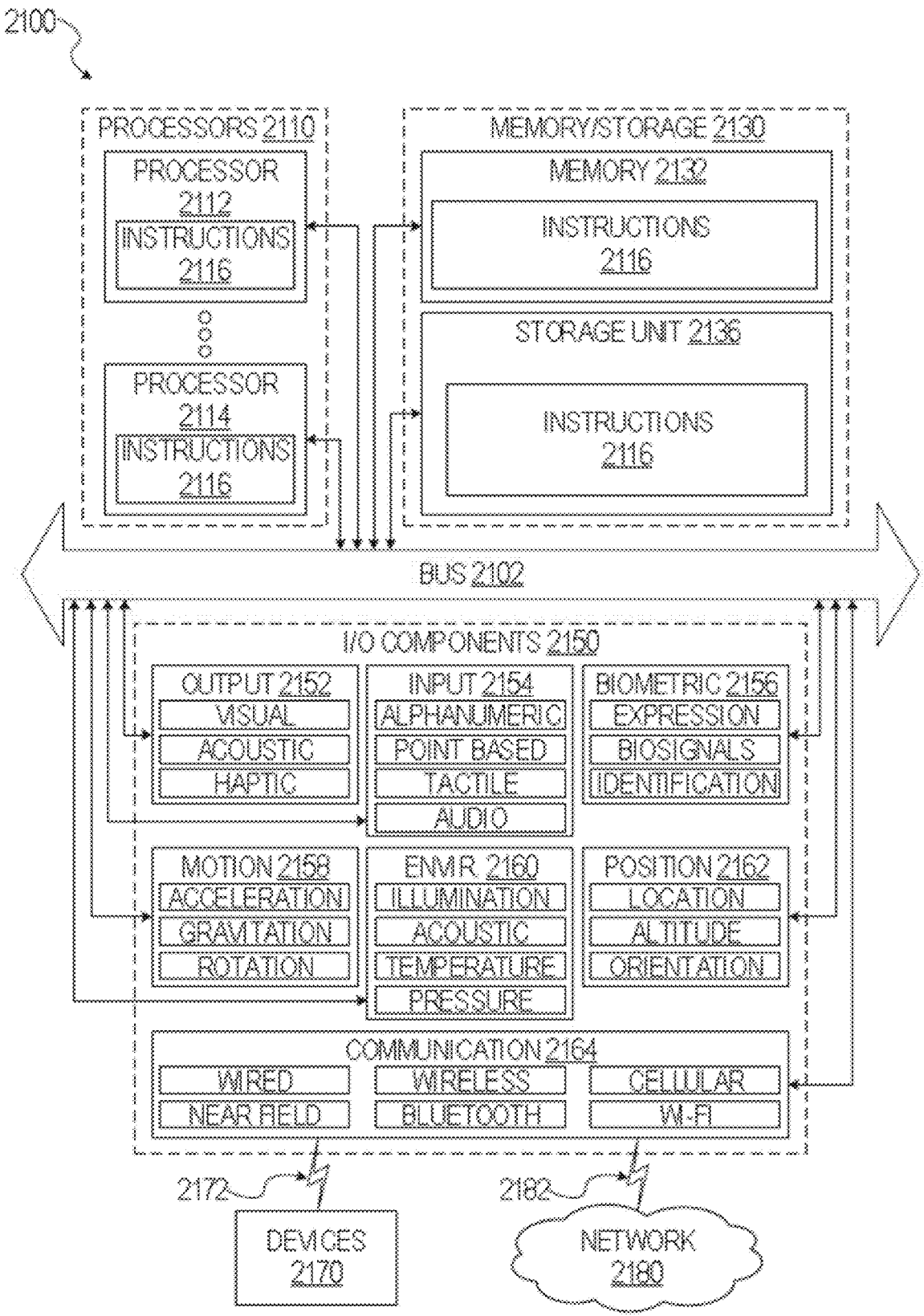
FIG. 21 illustrates a diagrammatic representation of a machine in the form of a computer system within which a set of instructions may be executed for causing the machine to perform any one or more of the methodologies discussed herein, according to an example embodiment.

FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed.

For example, the instructions may cause the machine to execute the flow diagrams of FIGS. 13-14. Additionally, or alternatively, the instructions may implement the modules depicted in FIG. 3. Specifically, the instructions 2116 may implement the various functions of the virtual module 320, the command module 340, and the execution module 360.

The instructions transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory 2130, and I/O components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 2112 and processor 2114 that may execute instructions 2116. The term "processor" is intended to include multi-core processor that may comprise two or more independent processors (sometimes referred to as "cores") that may execute instructions contemporaneously. Although FIG. 21 shows multiple processors, the machine 2100 may include a single processor with a single core, a single processor with multiple cores (e.g., a multi-core process), multiple processors with a single core, multiple processors with multiples cores, or any combination thereof.

The memory 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 21. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e g, hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172, respectively. For example, the communication components 2164 may include a network interface component or other suitable device to interface with the network 2180. In further examples, communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as, location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a VPN, a LAN, a WLAN, a WAN, a WWAN, a (MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A device comprising:
   a plurality of touch simulators;
   one or more processors; and
   one or more computer-readable media storing instructions that, when executed by the one or more processors, cause the one or more processors to perform operations comprising:
      receiving a texture signature associated with an item included in a listing for a network-based marketplace;
      determining a haptic output associated with the texture signature;
      detecting a change in a location of contact with the plurality of touch simulators relative to the item; and
      causing the plurality of touch simulators to output the haptic output simulating a texture of the item included in the listing, wherein the haptic output is output based on the change in the location of contact with the plurality of touch simulators.

2. The device of claim 1, wherein the plurality of touch simulators are included in one or more of a glove, a suit, a wearable device, a trackpad, or a touchscreen.

3. The device of claim 1, wherein the haptic output comprises a change in pressure.

4. The device of claim 1, wherein the haptic output comprises a plurality of pulses that are output based on a smoothness indicated by the texture signature.

5. The device of claim 1, wherein receiving the texture signature associated with the item includes receiving a plurality of texture signatures associated with the item, each of the plurality of texture signatures being associated with a different portion of the item.

6. The device of claim 1, wherein determining the haptic output associated with the texture signature comprises identifying a touch location at which the item is contacted in a virtual environment and a direction of motion along which the item is contacted from the touch location and, wherein the haptic output is generated based on the touch location and the direction of motion.

7. The device of claim 1, wherein detecting the change in the location of contact with the plurality of touch simulators comprises:
   determining a first location of contact by a user with the plurality of touch simulators; and
   determining a second location of contact by the user with the plurality of touch simulators, wherein the second location of contact is different than the first location of contact.

8. The device of claim 1, further comprising:
   a visual display; and
   the operations further comprising:

determining a visual representation associated with the texture signature; and outputting, by the visual display, the visual representation with the haptic output for the item included in the listing.

9. The device of claim 8, wherein a speed associated with the visual representation is based on a weight signature associated with the item included in the listing.

10. The device of claim 1, wherein the texture signature includes a representation of a defect at a location in the item included in the listing.

11. The device of claim 1, further comprising determining a temperature characteristic for the item included in the listing based on the texture signature and causing at least some of the plurality of touch simulators to change temperature based on the temperature characteristic.

12. The device of claim 1, further comprising:

a fragrance system; and the operations further comprising determining a scent signature associated with the item included in the listing and causing the fragrance system to output a fragrance composition defined by the scent signature.

13. The device of claim 1, further comprising:

a speaker; and the operations further comprising determining an auditory characteristic for the item included in the listing based on the texture signature and causing the speaker to output a sound defined by the auditory characteristic.

14. A method comprising:

displaying an item included in a listing for a network-based marketplace in a virtual environment;

receiving a texture signature associated with the item;

determining a haptic output associated with the texture signature;

detecting a touch location contacting the item in the virtual environment;

detecting a change to the touch location contacting the item in the virtual environment; and causing at least one touch simulator to output the haptic output in response to detecting the touch location, wherein the haptic output is output based on the change to the touch location contacting the item in the virtual environment.

15. The method of claim 14, wherein the at least one touch simulator is included in one or more of a glove, a suit, a wearable device, or a trackpad.

16. The method of claim 14, wherein receiving the texture signature associated with the item includes receiving a plurality of texture signatures associated with the item, each of the plurality of texture signatures being associated with a different portion of the item, and the haptic output comprises a different haptic output for each of the plurality of texture signatures.

17. The method of claim 14, wherein the haptic output comprises a change in pressure.

18. The method of claim 14, wherein the haptic output comprises a change in temperature.

19. The method of claim 14, further comprising at least one of:

determining a scent signature associated with the item included in the listing and causing a fragrance system to output a fragrance composition defined by the scent signature;

determining a visual characteristic associated with the item included in the listing based on the texture signature and displaying a visual representation of the item based on the visual characteristic; or determining an auditory characteristic for the item included in the listing based on the texture signature and causing a speaker to output a sound defined by the auditory characteristic.

20. A computer-readable storage medium storing instructions that are executable by one or more processors to perform operations comprising:

displaying an item included in a listing for a network-based marketplace in a virtual environment;

receiving a texture signature associated with the item;

determining a haptic output associated with the texture signature;

detecting a touch location contacting the item in the virtual environment;

detecting a change to the touch location contacting the item in the virtual environment; and causing at least one touch simulator to output the haptic output in response to detecting the touch location, wherein the haptic output is output based on the change to the touch location contacting the item in the virtual environment.

* * * * *